United States Patent
Lo et al.

(10) Patent No.: US 7,986,465 B1
(45) Date of Patent: Jul. 26, 2011

(54) SYSTEMS AND METHODS FOR EFFECTING ZOOM AND FOCUS USING FLUIDIC ADAPTIVE LENSES

(75) Inventors: Yu-Hwa Lo, San Diego, CA (US);
Jeffrey R. Vasko, San Diego, CA (US);
Robert S. Vasko, San Diego, CA (US)

(73) Assignee: Rhevision Technology, Inc., Rancho Santa Fe, CA (US)

( * ) Notice: Subject to any disclaimer, the term of this patent is extended or adjusted under 35 U.S.C. 154(b) by 33 days.

(21) Appl. No.: 12/039,615

(22) Filed: Feb. 28, 2008

Related U.S. Application Data

(60) Provisional application No. 60/892,485, filed on Mar. 1, 2007.

(51) Int. Cl.
*G02B 1/06* (2006.01)
(52) U.S. Cl. .................................. 359/666; 359/665
(58) Field of Classification Search .......... 359/665–667
See application file for complete search history.

(56) References Cited

U.S. PATENT DOCUMENTS

| | | |
|---|---|---|
| 3,598,479 A | 8/1971 | Wright |
| 3,641,354 A | 2/1972 | DeMent |
| 4,261,655 A | 4/1981 | Honigsbaum |
| 4,466,706 A | 8/1984 | Lamothe, II |
| 4,890,903 A | 1/1990 | Treisman et al. |
| 4,913,536 A | 4/1990 | Barnea |
| 5,233,470 A | 8/1993 | Wu |
| 5,443,506 A | 8/1995 | Garabet |
| 5,446,591 A | 8/1995 | Medlock |
| 5,886,332 A | 3/1999 | Piesko |
| 5,917,657 A | 6/1999 | Kaneko et al. |
| 5,973,852 A | 10/1999 | Task |
| 6,081,388 A | 6/2000 | Widl |
| 6,188,526 B1 | 2/2001 | Sasaya et al. |
| 6,304,364 B1 | 10/2001 | Qin et al. |
| 6,369,954 B1 | 4/2002 | Berge et al. |
| 6,498,353 B2 | 12/2002 | Nagle et al. |
| 6,618,208 B1 | 9/2003 | Silver |
| 6,638,306 B2 | 10/2003 | Cumming |
| 6,718,074 B1 | 4/2004 | Dutta-Choudhury et al. |
| 6,737,646 B2 | 5/2004 | Schwartz |
| 6,891,682 B2 | 5/2005 | Aizenberg |
| 6,977,777 B1 | 12/2005 | Wick |
| 6,999,238 B2 | 2/2006 | Glebov |

(Continued)

FOREIGN PATENT DOCUMENTS

FR             892220 A     3/1944

(Continued)

OTHER PUBLICATIONS

Data sheet for Optical Fluid LS-5257, printed on Mar. 16, 2010 from http://www.focenter.com.

(Continued)

*Primary Examiner* — Jordan M. Schwartz
(74) *Attorney, Agent, or Firm* — Cooley LLP

(57) ABSTRACT

Fluidic lens devices, and systems employing such lens devices, along with methods of fabricating and operating such lens devices, are disclosed. Certain of the disclosed structures permit fluidic lens devices to operate without valves that control fluid exchange between fluidic lenses and reservoirs. Also disclosed are fluidic lens devices that comprise a fluidic lens but no reservoir. Additional disclosed structures and methods permit fluidic lens devices to perform zoom and focus functions.

9 Claims, 24 Drawing Sheets

U.S. PATENT DOCUMENTS

| | | |
|---|---|---|
| 7,038,701 B2 | 5/2006 | Niemi |
| 7,041,134 B2 | 5/2006 | Nguyen et al. |
| 7,065,256 B2 | 6/2006 | Alon et al. |
| 7,068,439 B2 * | 6/2006 | Esch et al. ............... 359/666 |
| 7,126,903 B2 | 10/2006 | Feenstra |
| 7,256,943 B1 | 8/2007 | Kobrin et al. |
| 7,261,737 B2 | 8/2007 | Esch et al. |
| 7,367,550 B2 | 5/2008 | Lee |
| 7,405,884 B2 * | 7/2008 | Nishioka et al. ........... 359/665 |
| 7,443,596 B1 | 10/2008 | Berge |
| 7,453,646 B2 | 11/2008 | Lo et al. |
| 7,549,806 B2 * | 6/2009 | Huang .................... 396/349 |
| 7,594,726 B2 * | 9/2009 | Silver ..................... 351/168 |
| 7,627,236 B2 * | 12/2009 | Ojala ...................... 396/55 |
| 7,646,544 B2 | 1/2010 | Batchko et al. |
| 7,675,686 B2 | 3/2010 | Lo et al. |
| 2001/0017985 A1 | 8/2001 | Tsuboi et al. |
| 2002/0176148 A1 | 11/2002 | Onuki et al. |
| 2003/0095336 A1* | 5/2003 | Floyd ..................... 359/665 |
| 2004/0017492 A1 | 1/2004 | Stavely |
| 2004/0189830 A1 | 9/2004 | Pollard |
| 2005/0055025 A1* | 3/2005 | Zacouto et al. .............. 606/72 |
| 2005/0200973 A1 | 9/2005 | Kogo et al. |
| 2005/0270664 A1 | 12/2005 | Pauker et al. |
| 2006/0092505 A1 | 5/2006 | Abnet et al. |
| 2006/0125937 A1 | 6/2006 | LeGall et al. |
| 2007/0211207 A1* | 9/2007 | Lo et al. ................... 351/41 |
| 2008/0218873 A1* | 9/2008 | Batchko et al. ........... 359/665 |

FOREIGN PATENT DOCUMENTS

| | | |
|---|---|---|
| FR | 1117690 A | 5/1956 |
| GB | 1327503 A | 8/1973 |
| GB | 2184562 | 6/1987 |
| JP | 60057308 A | 4/1985 |
| JP | 62005201 A | 1/1987 |
| JP | 2002169005 | 6/2002 |
| WO | 0058763 A1 | 10/2000 |
| WO | 200214926 | 2/2002 |
| WO | 2002061681 | 8/2002 |
| WO | 03015669 | 2/2003 |
| WO | 03069380 | 8/2003 |
| WO | 2004038480 A1 | 5/2004 |
| WO | 2004102250 A1 | 11/2004 |
| WO | 2005073895 A1 | 8/2005 |
| WO | 2006011937 A2 | 2/2006 |
| WO | 2006088514 A2 | 8/2006 |

OTHER PUBLICATIONS

Jo, Byung-Ho, et al., Journal of Microelectromechanical Systems, vol. 9, No. 1, Mar. 2000, pp. 76-81.

Ng, et al., Light Field Photography with a Hand-Held Plenoptic Camera, Stanford University Computer Science Tech Report CSTR 2005-02 Apr. 2005.

Rawicz and Mikhailenko, Modeling a Variable-Focus Liquid-Filled Optical Lens, Applied Optics, vol. 35, No. 10, Apr. 1, 1996, p. 1587-1589.

Suriura and Morita, Variable-Focus Liquid-Filled Optical Lens, Applied Optics, vol. 32, No. 22, Aug. 1993, p. 4181-4186.

Thanawala, et al "Surface modification of silicone elastomer using perfluorinated either," Langmuir, 16(3), (2000) 1256-1260.

U.S. Appl. No. 12/413,358 Non-Final Rejection mailed Dec. 22, 2010.

U.S. Appl. No. 12/256,961 Non-Final Rejection mailed Mar. 24, 2010.

U.S. Appl. No. 11/683,141 Non-Final Rejection mailed Nov. 23, 2007.

U.S. Appl. No. 10/599,486 Non-Final Rejection mailed Mar. 18, 2008.

U.S. Appl. No. 10/599,486 Non-Final Rejection mailed Dec. 15, 2008.

University of Wisconsin-Madison College of Engineering, Autonomous lenses may bring microworld into focus, vol. 33, No. 1, Fall 2006, pp. 1 and 3.

Xia, Younan, et al., Angnew. Chem. Int. Ed., 1998, 37, pp. 550-575.

Zhang, D-Y., et al., "Fludic Adaptive Lens with High Focal Length Tunability," Applied Physics Letters, 82 (19):3171-3172, May 2003.

* cited by examiner

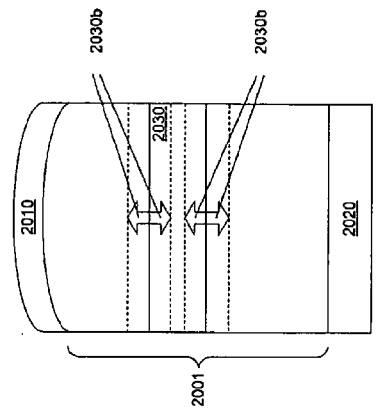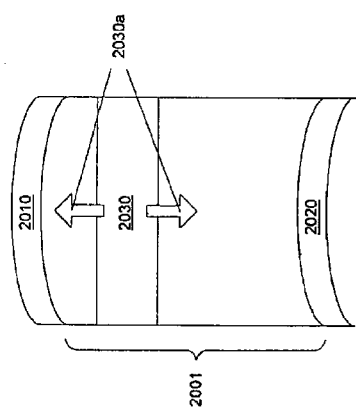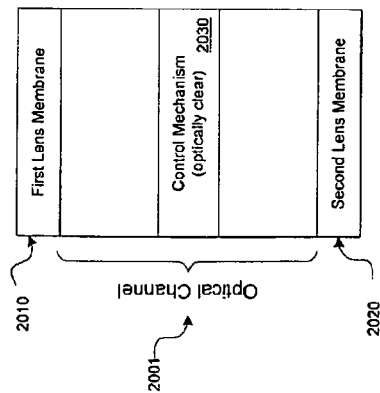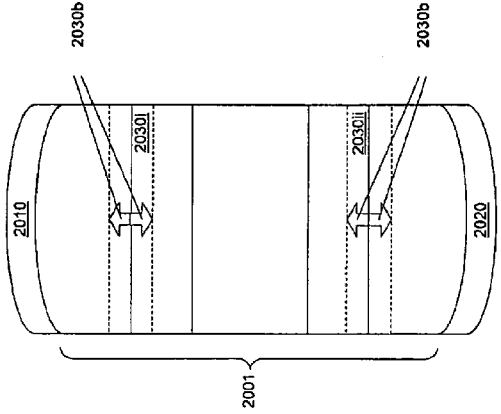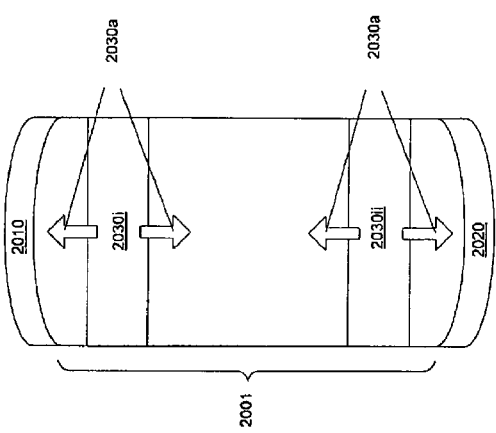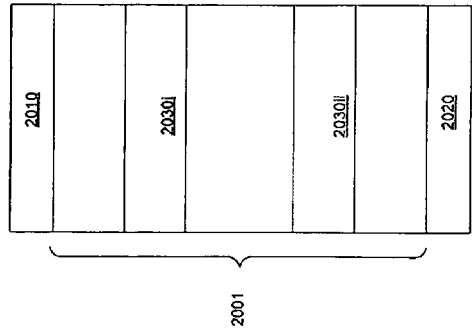

SYSTEMS AND METHODS FOR EFFECTING ZOOM AND FOCUS USING FLUIDIC ADAPTIVE LENSES

PRIORITY

This application claims priority to U.S. provisional application No. 60/892,485, entitled "Systems and Methods for Effecting Zoom and Focus Using Fluidic Adaptive Lenses" filed on Mar. 1, 2007, which is hereby incorporated by reference herein.

FIELD OF THE INVENTION

The present invention relates to fluidic adaptive lens systems and methods. In particular, but not by way of limitation, the present invention relates to systems and methods for effecting zoom and focus using fluidic adaptive lenses in various optical systems.

BACKGROUND OF THE INVENTION

Optical lenses are employed in a variety of devices for many purposes such as modifying focus and magnification. Many conventional devices that employ optical lenses use lenses that are made from solid materials, such that the optical properties of the lenses (e.g., their focal distances) remain constant or nearly constant over time. For example, cameras and other optical systems such as microscopes, video monitors, video recorders, copy machines, and scanners commonly employ solid lenses.

The use of solid lenses with fixed optical properties entails disadvantages in systems that employ combinations of lenses that interact with one another to provide overall optical properties. Such systems include, for example, zoom and focus lens systems in which two or more optical lenses of fixed optical properties are moved relative to one another to change optical properties of the overall combination of lenses forming the zoom and focus lens. Because the optical properties of the individual lenses used in such systems are fixed, the overall optical properties of the combinations of lenses depend upon other factors, particularly the relative positioning of the individual lenses. Consequently, to provide the desirable features and capabilities associated with systems such as zoom and focus lens systems, complicated and expensive mechanical and/or other components and techniques must be employed to achieve the desired effects.

In particular, conventional systems with zooming and focusing capabilities are typically more expensive and often more bulky than systems without such capabilities. Currently, all optical zoom and focus lenses achieve zoom-in, zoom-out and focus functions by changing the distance(s) between the individual lenses forming the overall zoom and focus lens. This involves high-precision mechanical motions of the lenses over a typical range of several centimeters. To provide highly-precise, reliable relative movement of the lenses typically requires a mechanical system that is complicated, slow, bulky and expensive.

The need to vary lens distance to achieve zooming and focusing has become a roadblock for incorporating zooming features into many new and emerging applications. Many modern "electronic gadgets" including cell phones, personal digital assistants (PDAs), and notebook computers are equipped with CCD or CMOS cameras. Implementation of cameras into such gadgets has evolved from being a novelty to being a standard feature, and many such gadgets now support imaging-related functions that involve not just imaging but also recording, videophone capabilities, and video conferencing. Yet conventional zoom and focus lenses are difficult to incorporate into these small electronic gadgets and their optical devices.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The invention can provide a tunable lens system, method for manufacturing the tunable lens system and method for operating the tunable lens system.

In accordance with certain of the embodiments of the invention, a tunable lens system comprises a fluidic lens forming a first cavity that stores a first volume of a fluidic medium, and a reservoir forming a second cavity that stores a second volume of the fluidic medium. The lens system further comprises a pressure vessel capable of causing the fluidic medium to move between the fluidic lens and the reservoir, which varies an optical property of the fluidic lens. The pressure vessel may form at least a portion of the reservoir or be positioned external to or within the reservoir.

In accordance with certain of the embodiments of the invention, the lens system described above further comprises a valve disposed between the fluidic lens and the reservoir. The valve controls movement of the fluidic medium between the fluidic lens and the reservoir.

In accordance with certain of the embodiments of the invention, a lens system includes a sensor for receiving one or more light waves that pass one or more fluidic lenses, and a processor for receiving one or more signal's from the sensor that relate to the one or more light waves. The processor operates on at least one of the one or more signals to control a pressure vessel, which in turn varies an optical property of the one or more fluidic lenses.

In accordance with certain of the embodiments of the invention, a lens system comprises a fluidic lens and a pressure vessel. The pressure vessel, which controls the profile of a flexible lens membrane that forms part of the fluidic lens, may form at least a portion of the fluidic lens or be positioned external to or within the tunable lens.

Additional embodiments relate to a lens system that comprises a plurality of fluidic lenses, each storing certain volumes of a fluidic medium, and one or more reservoirs that store certain volumes of the fluidic medium. The lens system further comprises a plurality of valves that are disposed between each of the plurality of fluidic lenses and one or more reservoirs that each form cavities that store various volumes of the fluidic medium.

In accordance with other embodiments, a valveless lens system comprises a plurality of fluidic lenses and a respective plurality of reservoirs. The lens system further comprises one or more pressure vessels capable of causing fluidic medium to move between one or more of the plurality of fluidic lenses and the one or more of the respective plurality of reservoirs. The movement of the fluidic medium varies optical properties of the one or more fluidic lenses. The one or more pressure vessels may form at least a portion of the one or more respective reservoirs or be positioned external to or within the one or more respective reservoirs.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIGS. 20A-F illustrate a configuration of a fluidic lens apparatus in accordance with one or more embodiments of the invention;

DETAILED DESCRIPTION OF EMBODIMENTS OF THE INVENTION

Figure 1A:
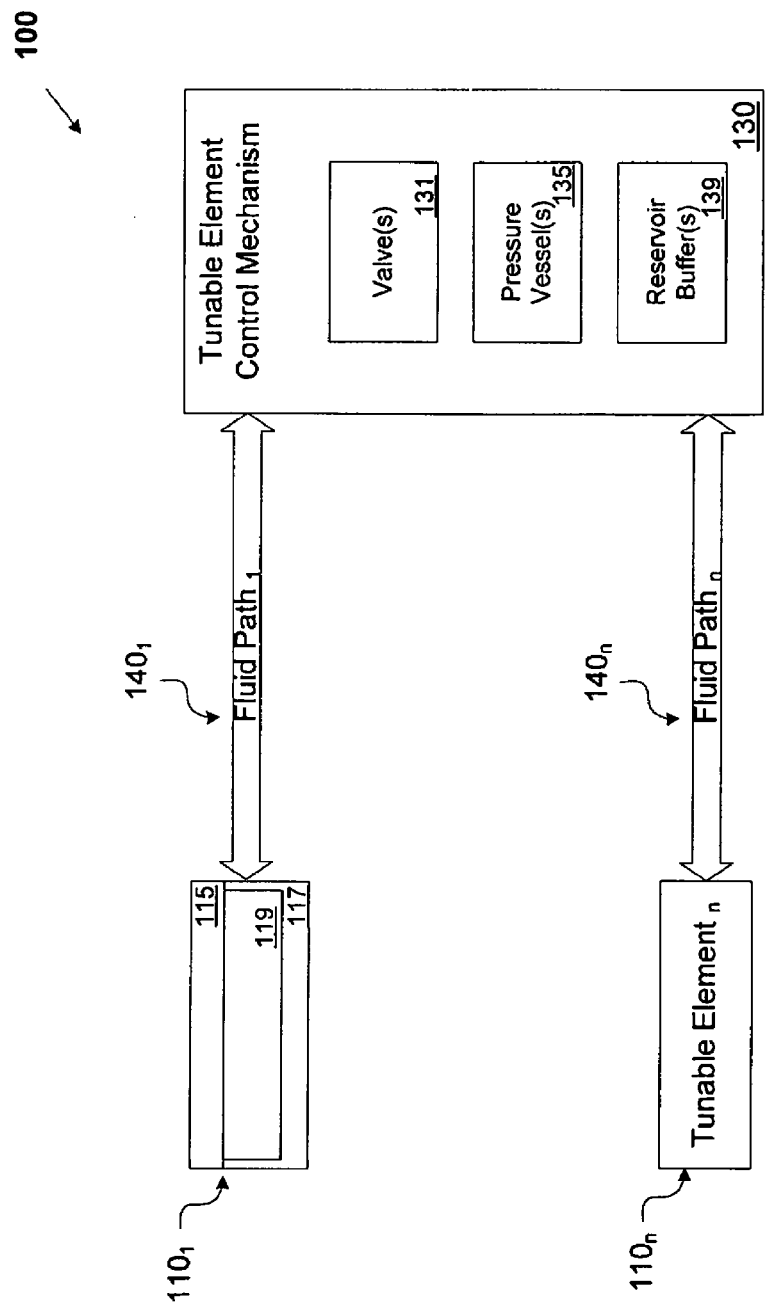
FIG. 1A depicts a fluidic lens apparatus in accordance with an exemplary embodiment of the invention.

Attention is drawn to FIG. $1a$, which depicts a fluidic lens apparatus 100 in accordance with an exemplary embodiment of the invention. As shown, the apparatus 100 comprises n tunable elements 110 including, for example, a tunable element $110_1$. One of skill in the art will appreciate that the apparatus 100 can include any number of tunable elements 110 (denoted herein as "n tunable elements 110"). The apparatus 100 also comprises at least one tunable element control mechanism 130. In an exemplary embodiment, as shown in FIG. $1a$, the n tunable elements 110 and the tunable element control mechanism 130 are in fluid communication with each other via n fluid pathways 140.

The tunable element $110_1$, for example, comprises at least one lens membrane 115 coupled to at least one lens chamber 117. The coupling of the lens membrane 115 to the lens chamber 117 creates a cavity 119. The cavity 119 is filled with a fluidic medium (also referred to as "fluid" herein). One of skill in the art will appreciate alternative embodiments to that shown in FIG. $1a$, including embodiments where two or more lens membranes are coupled to a lens chamber, or where a lens membrane is coupled to two or more lens chambers.

The lens membrane 115 may be, for example, polydimethylsiloxane ("PDMS") or silicone rubber. One of skill in the art will appreciate that the lens membrane 115 may be designed to possess not only high flexibility but also reasonably low spring constant. The lens membrane 115 may also be designed to possess a relatively high resistance to both UV radiation under sun light and water condensation when temperature drops below dew point. Therefore, any material providing some or all of the abovementioned qualities may be used in the lens membrane 115.

Figure 1B:
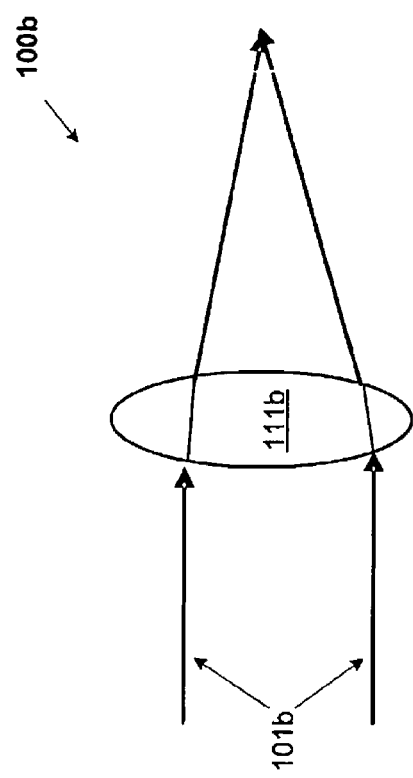
FIG. 1B illustrates one example of a transmissive fluidic lens system.

One of skill in the art will appreciate that the lens membrane 115 may be used in a transmissive system. A transmissive system is one in which light passes through the lens membrane 115 (e.g., a camera lens, eye glasses, etc.). When used in a transmissive system, the lens membrane 115 is ideally designed to have transparent or optically clear characteristics. FIG. 1b illustrates one example of a transmissive system 100b. As shown, light rays 101b pass through lens 111b.

Figure 1C:
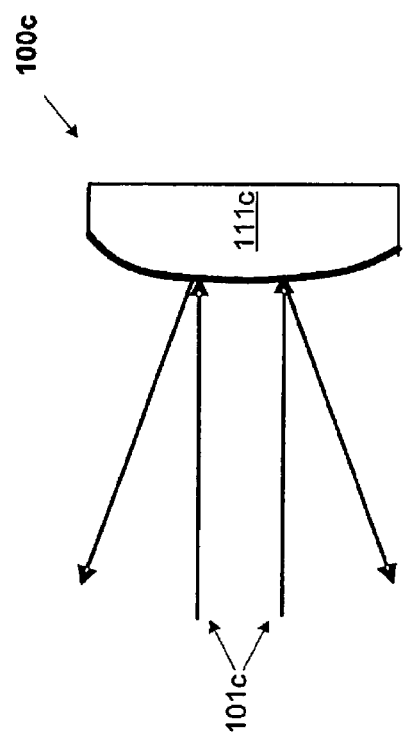
FIG. 1C illustrates one example of a reflective fluidic lens system.

One of skill in the art will further appreciate that the lens membrane 115 may be used in a reflective system. A reflective system is one in which light reflects off of the lens membrane 115 (e.g., a mirror). When used in a reflective system, the lens membrane 115 is designed to have some reflective characteristics. In the reflective system, the lens membrane 115 may include an elastic metal or other material that provides reflective characteristics. FIG. 1c illustrates one example of a reflective system 100c. As shown, light rays 101c reflect off of lens 111c.

One of skill in the art will further appreciate that the lens apparatus 100 may be used in relation to both imaging systems and non-imaging systems. Imaging systems include cameras, microscopes and telescopes. Non-imaging systems include laser-beam-forming systems and illumination control systems.

The lens chamber 117 may be formed from, for example, silicone rubber. One of skill in the art will appreciate that the lens chamber 117 may be formed from any material suitable for preventing the fluidic medium from escaping the cavity 119.

The fluid medium that fills the cavity 119 may be selected to have one or more of the following preferred characteristics: a relatively high index of refraction (e.g., to achieve high lens power and wide tuning range); a low attenuation over the wavelength spectrum of interest (e.g., wavelength spectrums of 430-700 nm and 400-1600 nm); a wide range of operable temperature (e.g. −20 C to >60 C); a wide range of storage temperature (e.g. −40 C to 100 C); an extremely low (nearly zero) vapor pressure (e.g., to prevent loss of fluid by evaporation through the gas permeable lens membrane 110b); and a chemical stability with the lens membrane and chamber material. Other considerations are made when selecting the fluidic medium, such as safety, biocompatibility and/or toxicity. These considerations may outweigh shortcomings associated with index of refraction, vapor pressure, or other previously-mentioned design characteristics. Suitable fluidic mediums may include polyphenyl ether ("PPE"), thioethers benzene, various ionic fluids (e.g., 1-butyl-1-methylpyrrolidinium tris(pentafluoroethyl)trifluorophosphate and 1-hexyl-3-methylimidazolium tris (pentafluoroethyl)trifluorophosphate), saline, water, methanol, conventional lens oil, and gas (e.g., $CO_2$ and compressed air). In several embodiments, the fluidic medium is incompressible so that the total fluid volume within the apparatus 100 is approximately constant if the effect of thermal expansion is neglected during normal operation conditions. When a gas is used in the fluid medium, the total volume of the apparatus 100 will not be constant because of the compressibility associated with gas. Instead, the product of volume and pressure will remain approximately constant at a given temperature.

One of skill in the art will appreciate that other tunable elements included in the n tunable elements 110 are configured with specifications similar to those discussed with respect to the tunable element $110_1$. More specifically, the other tunable elements may comprise one or more lens membranes coupled to one or more lens chambers. Each of the one or more cavities formed by the coupling of the one or more lens membranes to the one or more lens chambers may comprise a fluidic medium selected from various fluid mediums within the scope and spirit of the present invention.

The tunable element control mechanism 130 may include any number of elements including, by way of example, one or more valves 131, pressure vessels 135, and reservoir buffers ("reservoirs") 139.

The valve(s) 131 may include any type of valve configured to regulate the flow of a fluidic medium to/from the tunable element control mechanism 130 and from/to the n tunable elements 110. For example, the valve 131 may have only an open state and a closed state. Alternatively, the valve 131 may have a fully open state, a closed state, and one or more partially open states that allow different volumes of a fluidic medium to pass through the valve during a time period. By way of example, the valve 131 may be a digital valve, analog valve, pulse train valve, or a piezoelectric valve, among others.

The reservoir 139 stores a fluidic medium (e.g., the same fluidic medium that fills the cavity 119). The reservoir 139 may be configured with inelastic or elastic walls. When configured with elastic walls, the walls of the reservoir 139 may flex when the fluidic medium is added to or extracted from the reservoir 139. Put another way, the walls of the reservoir 139 may flex to add/extract the fluidic medium to/from the reservoir 139. The reservoir 139 may be formed of any suitable inelastic, elastic, or inelastic-elastic hybrid material. In some embodiments, the reservoir 139 is unnecessary.

The n fluid paths 140 may be formed of any suitable inelastic, elastic, or inelastic-elastic hybrid material. In some embodiments, the fluid paths 140 are unnecessary (e.g., when the reservoir 139 is coupled directly to the tunable element 110, when the reservoir 139 is not included, etc.).

The pressure vessel(s) 135 are configured to apply positive or negative pressure to the fluidic medium in one or more of the tunable elements 110, the reservoir 139 and/or the fluid paths 140. By applying pressure, a pressure vessel 135 effectively controls movement of the fluid medium in to and out of a tunable element 110. One of skill in the art will appreciate various types and configurations of pressure vessels including, by way of example, one or more voice coils, screws, solenoids, muscle wire, motors (e.g., linear motors), variable volume elements ("VVE") (e.g., electro gels), electrochemical composites, cams, pistons, ball valves, bellows, and piezoelectric devices, among others.

The pressure vessel 135 may be externally or internally coupled to the tunable lens $110_1$ or the reservoir 139. Alternatively, the pressure vessel 135 may form part or all of the tunable lens $110_1$ and/or the reservoir 139. One of skill in the art will appreciate that the pressure vessel 135 may be positioned within the fluidic lens apparatus 100 in manner that places it in direct contact with the fluid medium. Under these circumstances, the fluidic medium and/or the pressure vessel 135 need be carefully selected to ensure that no reaction occurs between the fluidic medium and the material of the pressure vessel 135.

One of skill in the art will further appreciate that the valves 131 may be unnecessary in cases when the precision of the pressure vessel 135 reaches a certain level or where the pressure vessel 135 is capable of maintaining the positive or negative pressure with little or no power consumption.

One architecture generally applicable to the pressure vessel(s) 135 is an actuator that changes the volume of the fluidic medium in the reservoir(s) 139. For example, a piezoelectric monomorph or bimorph disk (not shown) may be mounted to an interior or exterior wall of the reservoir 139 so that the volume of the fluidic medium in the reservoir 139 can be varied by the profile of the piezoelectric bendable disk. One of skill in the art will appreciate that the piezoelectric disk may alternatively form all or a portion of the reservoir 139. When a voltage is applied (from a voltage source not shown), the piezoelectric disk may be bent downward to increase the volume of the fluid medium in the reservoir 139. When this occurs, the volume of fluidic medium in a corresponding tunable element 110 decreases. Alternatively, the piezoelectric disk may be bent upward to decrease the volume of the fluidic medium in the reservoir 139, which increases the volume of the fluidic medium in the tunable element 110.

The same volume control principles of above can be achieved with a stepping motor, a solenoid, a voice coil or a muscle wire. Solenoid and voice coil actuators are electromagnetic actuators. The muscle wire actuator requires titanium-nickel alloy which can go through a phase transition when the temperature reaches the phase transition point (typically between 40-90 C) depending on the composition of the alloy. When the phase transition happens, the crystal structure changes, resulting in a significant change in the physical length of the alloy. The amount of length change of muscle wire can be as large as several percentage points, which is orders of magnitude greater than the thermal expansion of any solid materials. Thus a muscle wire is an effective actuator when relatively large travel distance (or volume change of liquid) is required.

Those skilled in the art can readily recognize that numerous variations and substitutions may be made in the invention, its use and its configuration to achieve substantially the same results as achieved by the embodiments described herein. In particular, special considerations may be required for the selection of the lens membrane, lens chamber, fluid medium(s) and pressure vessel(s) for each specific application of the present invention. Accordingly, there is no intention to limit the invention to the disclosed exemplary forms. Many variations, modifications and alternative constructions fall within the scope and spirit of the disclosed invention as expressed in the claims.

Figure 2:
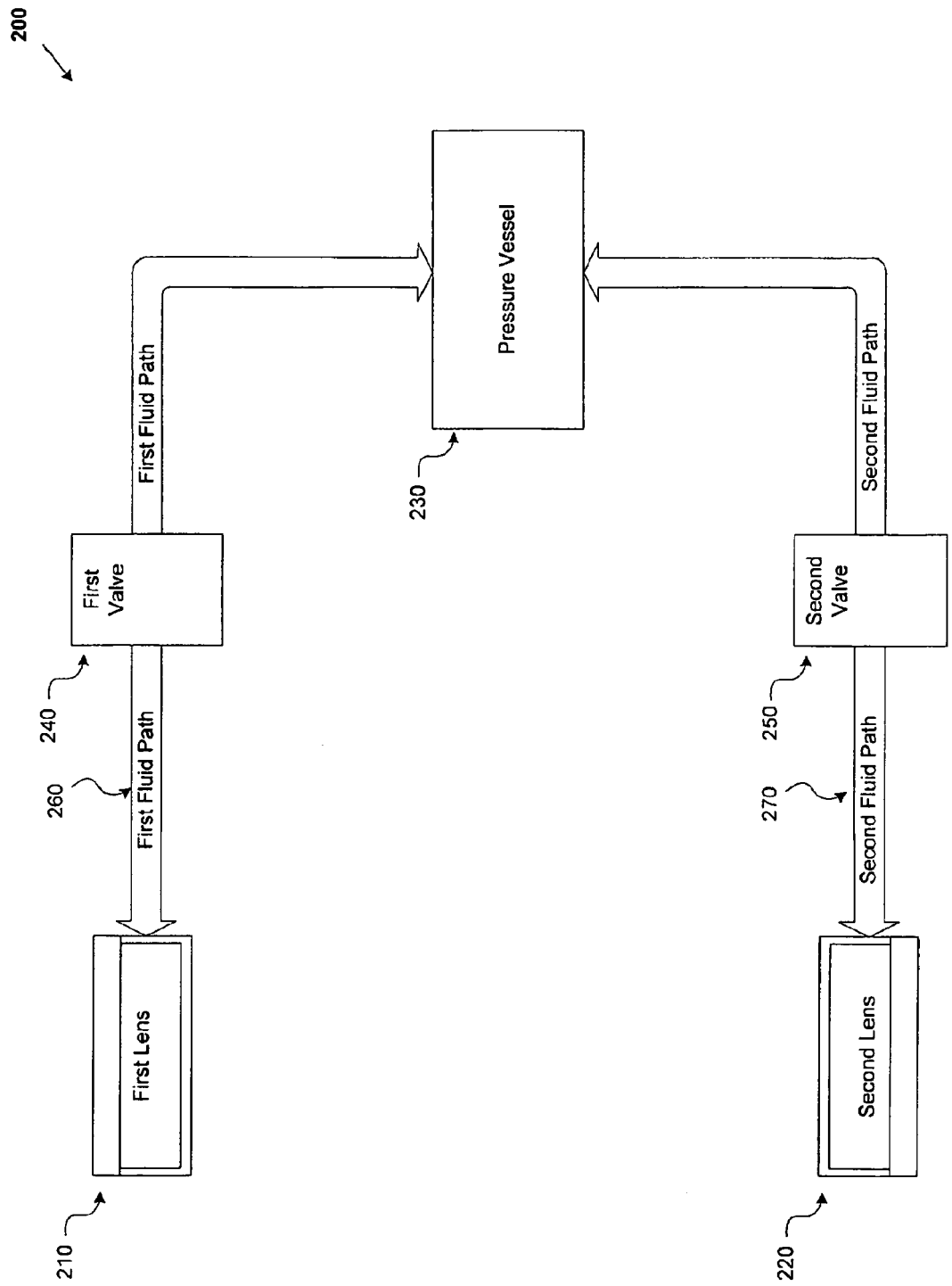
FIG. 2 depicts a configuration of a fluidic lens apparatus in accordance with one implementation of the invention.

Attention is now drawn to FIG. 2, which depicts an exemplary configuration of a fluidic lens apparatus 200 in accordance with one implementation of the invention. According to FIG. 2, the apparatus 200 comprises a first lens 210, a second lens 220, a pressure vessel 230, a first valve 240, a second valve 250, a first fluid path 260, and a second fluid path 270. The valves 240 and 250 are optional depending on the type of pressure vessel 230 implemented in the apparatus 200.

Figure 3:
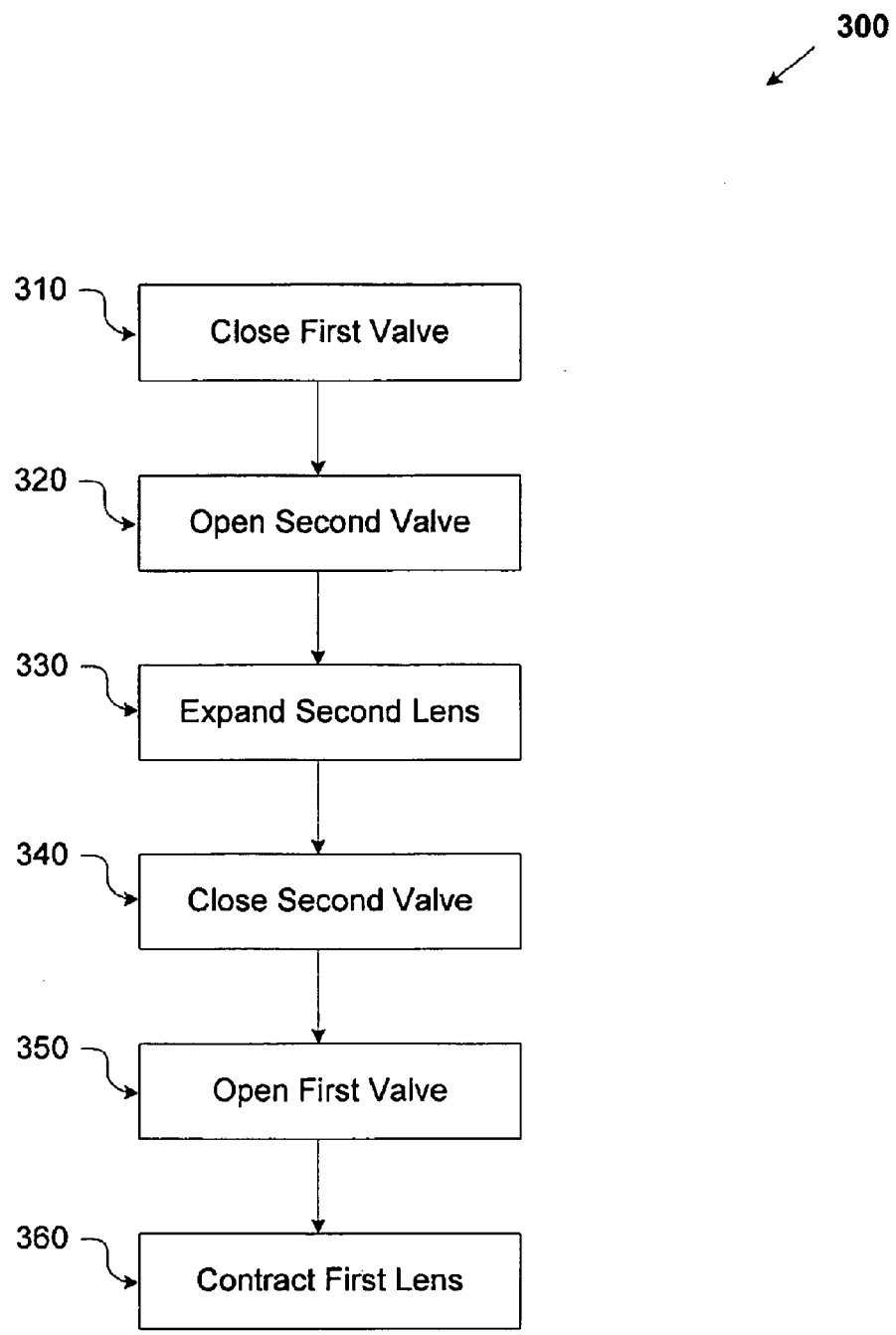
FIG. 3 shows a process flow diagram illustrating steps taken by a fluidic lens apparatus during a process for effecting zoom out in accordance with one implementation of the invention.
Figure 4:
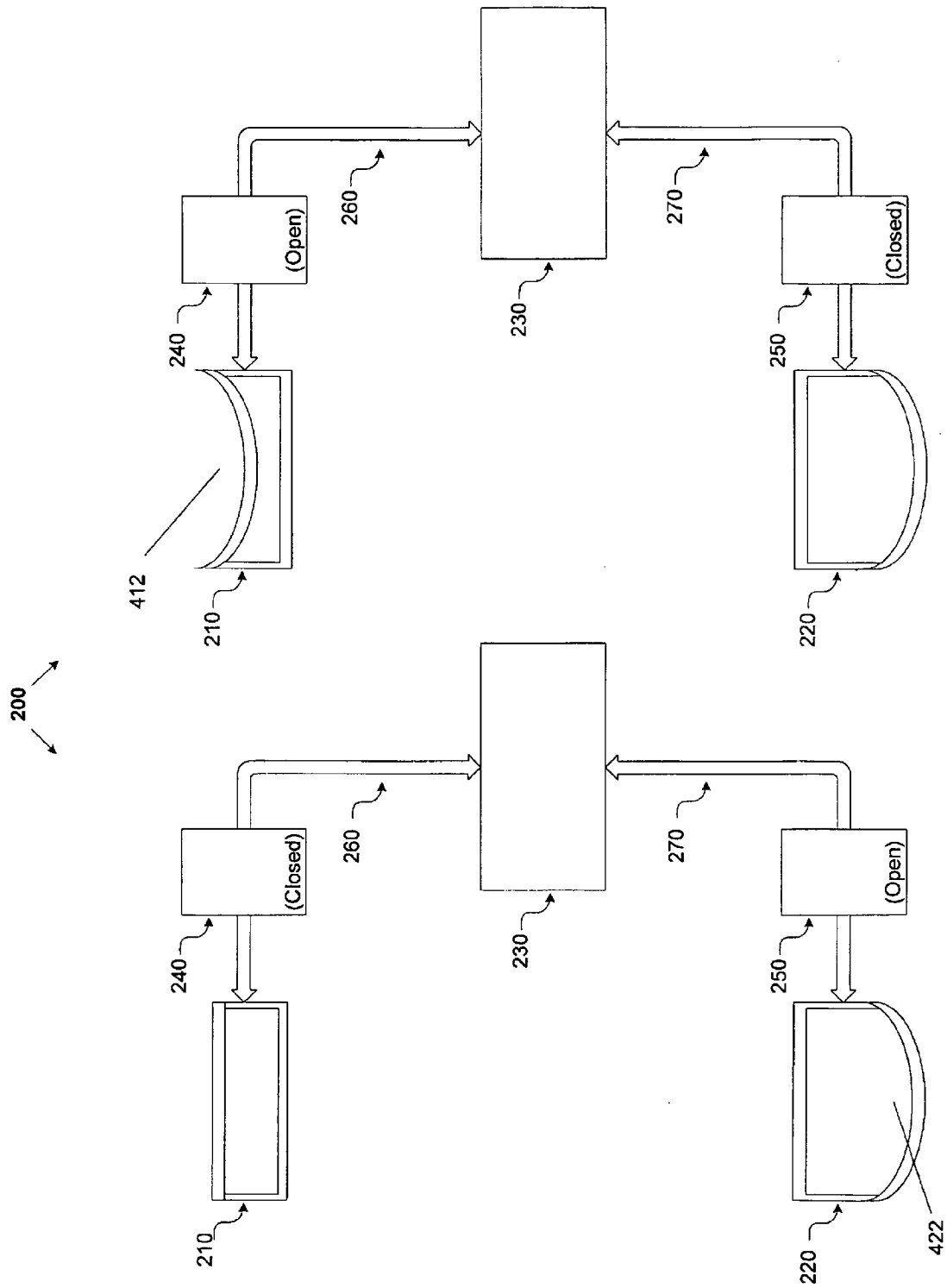
FIGS. 4A and 4B each depict a fluidic lens apparatus during different stages of a process for effecting zoom out.

Attention is now drawn to FIGS. 3-4. FIG. 3 shows a process flow diagram illustrating steps taken by the apparatus 200 during a process 300 for effecting zoom through cooperative use of the lenses 210 and 220 in accordance with one implementation of the invention. FIGS. 4A and 4B each depict the apparatus 200 during different stages of the process 300. While referring to FIG. 3, simultaneous reference will be made to FIGS. 4A and 4B. One of skill in the art will appreciate that one or more of steps 310-360 may be rearranged and/or omitted.

As shown in FIGS. 3 and 4A, the apparatus 200 closes the first valve 240 unless the first valve 240 is already closed (step 310). The closing of the first valve 240 effectively prevents travel of the fluidic medium in to and out of the first lens 210. The apparatus 200 opens the second valve 250 unless the second valve 250 is already open (step 320). The opening of the second valve 250 effectively permits travel of the fluidic medium in to and out of the second lens 220. The apparatus 200, via positive pressure applied by the pressure vessel 230, increases the volume of the fluidic medium in the second lens 220 by a target zoom volume 422 so that the lens membrane of the second lens 220 expands to form a plano-convex lens as shown in FIG. 4A (step 330). One of skill in the art will appreciate alternative lens formations.

As shown in FIGS. 3 and 4B, the apparatus 200 closes the second valve 250 (step 340), which effectively prevents travel of the fluidic medium in to and out of the second lens 220. The apparatus 200 opens the first valve 240 (step 350), which effectively permits travel of the fluidic medium in to and out of the first lens 210. The apparatus 200, via negative pressure applied by the pressure vessel 230, decreases the volume of the fluidic medium in the first lens 210 by a target zoom volume 412 so that the lens membrane of the first lens 210 contracts to form a plano-concave lens as shown in FIG. 4B (step 360). One of skill in the art will appreciate alternative lens formations.

The target zoom volumes 412 and 422 may be determined by various methods including, for example, using one or more look up tables to retrieve an approximate volume needed to achieve a zoomed image. The lookup table can be built up from a set of measurable parameters. For example, if the actuator that controls the pressure vessels is voltage driven, such as a piezoelectric actuator, then a lookup table can be developed to relate fluid volume to the applied voltage to the actuator.

In one design, the deflection of a piezoelectric/stainless steel disk (e.g., in a reservoir or tunable element) may be utilized to control the volume of the fluidic medium. For example, a monotonically increasing relation between the volume of the fluidic medium and the applied voltage to the piezoelectric actuator may be established over a range from −100V to +400V. At −100V, a negative volume displacement of approximately −5 uL is measured. At +400V, a positive volume displacement of approximately +20 uL is obtained. In embodiments where the fluid medium is conserved (that is, in closed systems), an adjustment amount of fluidic medium in a reservoir (e.g., an increase or decrease) corresponds to the same adjustment amount of fluidic medium in a tunable element (e.g., a decrease or increase respectively). One of skill in the art will appreciate embodiments which do not necessitate a reservoir. In such embodiments, the lookup table may correspond only to volume adjustment with the tunable element.

In reality, the properties of the fluidic medium, the components of the tunable element (e.g., chamber walls and lens membrane), the reservoir and/or the actuator/pressure vessel are all temperature dependent. Accordingly, the lookup table may require temperature correction. One straightforward approach is to identify a temperature from a thermistor and look up an appropriate volume in relation to that temperature. A more elegant approach would be "athermalization," which means that the temperature effects of separate elements are designed to be cancelled so that the net thermal effect is nullified over the temperature range of interest.

Whatever the approach or configuration, the approximate volume is used to drive the pressure vessel 230 so that the pressure vessel 230 increases or decreases the total volume of the fluidic medium in the lenses 210 and/or 220 in accordance with an amount of fluidic medium needed to achieve the approximate volume. One of skill in the art will appreciate alternative methods for increasing or decreasing the total volumes of fluidic medium in each of the lenses 210 and 220 in order to achieve a volume needed for a zoomed image.

Figure 5:
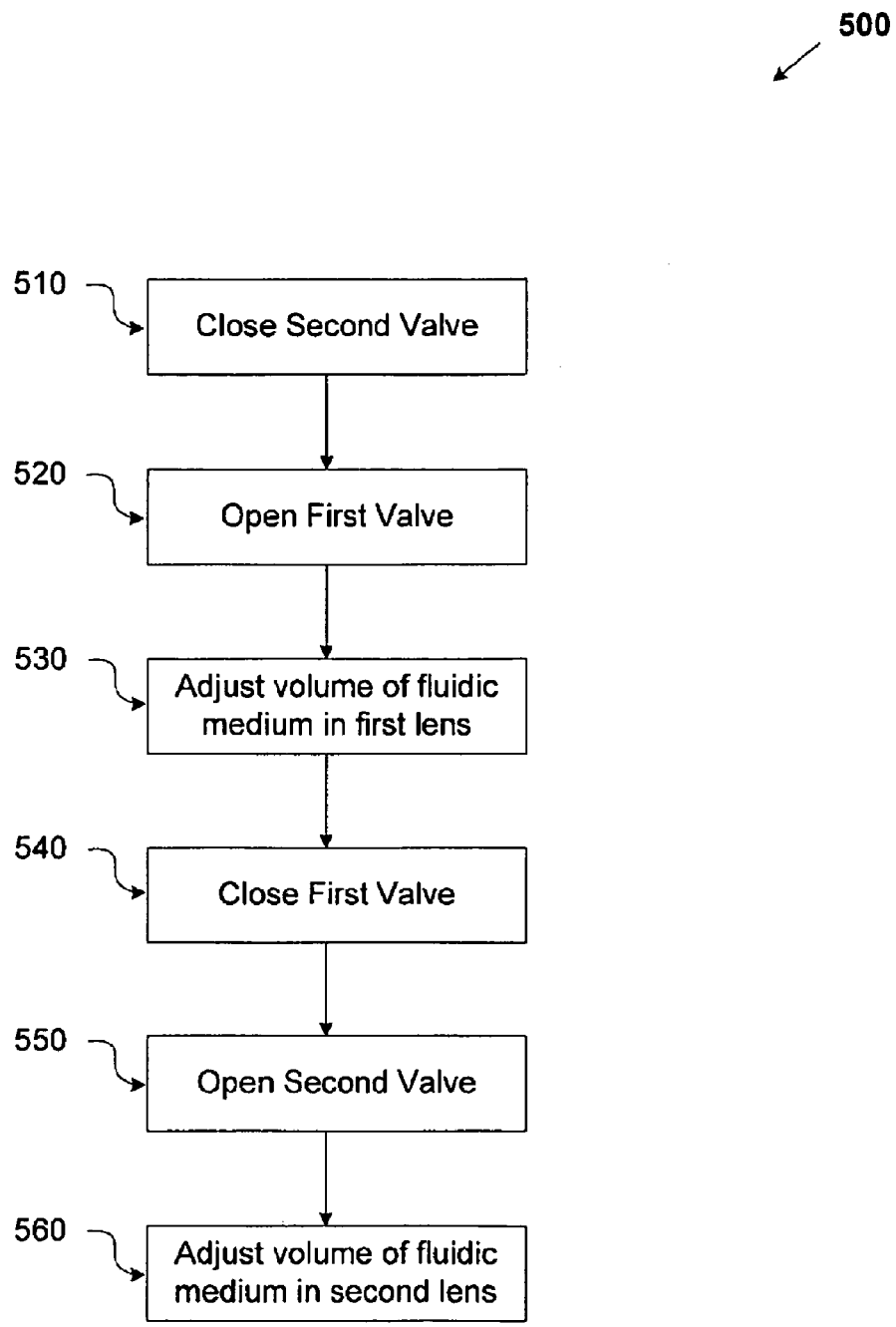
FIG. 5 shows a process flow diagram illustrating steps taken by a fluidic lens apparatus during a process for effecting focus in accordance with one implementation of the invention.
Figure 6:
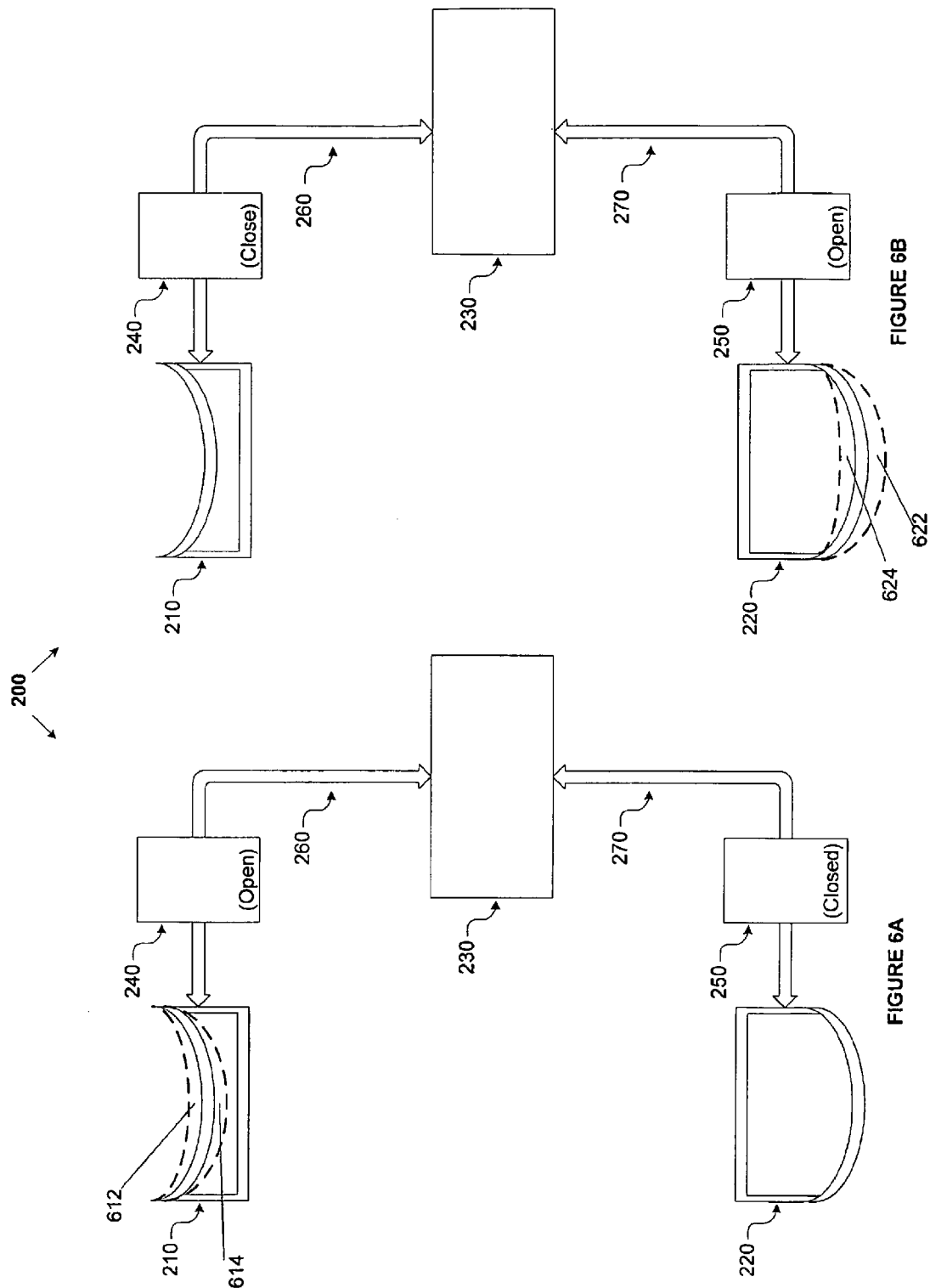
FIGS. 6A and 6B each depict a fluidic lens apparatus during different stages of a process for effecting focus.

Attention is now drawn to FIGS. 5-6. FIG. 5 shows a process flow diagram illustrating steps taken by the apparatus 200 during a process 500 for effecting focus through cooperative use of the lenses 210 and 220 in accordance with one implementation of the invention. FIGS. 6A and 6B each depict the apparatus 200 during different stages of the process 500. While referring to FIG. 5, simultaneous reference will be made to FIGS. 6A and 6B. One of skill in the art will appreciate that one or more of the steps 510-560 may be rearranged or omitted.

As shown in FIGS. 5 and 6A, the apparatus 200 closes the second valve 250 unless the second valve 250 is already closed (step 510). The closing of the second valve 250 effectively prevents travel of the fluidic medium in to and out of the second lens 220. The apparatus 200 opens the first valve 240 unless the first valve 240 is already open (step 520). The opening of the first valve 240 effectively permits travel of the fluidic medium in to and out of the first lens 210. The apparatus 200, via the pressure vessel 230, minimally increases or decreases the volume of the fluidic medium in the first lens 210 so that the lens membrane of the first lens 210 respectively expands or contracts by a total target focus volume 612 or 614, respectively (step 530).

As shown in FIGS. 5 and 6B, the apparatus 200 closes the first valve 240 (step 540), which effectively prevents travel of the fluidic medium in to and out of the first lens 210. The apparatus 200 opens the second valve 250 (step 550), which effectively permits travel of the fluidic medium in to and out of the second lens 220. The apparatus 200, via the pressure vessel 230, minimally increases or decreases the volume of the fluidic medium in the second lens 220 so that the lens membrane of the second lens 220 respectively expands or contracts by a total target focus volume 622 or 624, respectively (step 560). After step 560, the apparatus 200 may close the second valve 250 to maintain the volume of the second lens 220.

Figure 7:
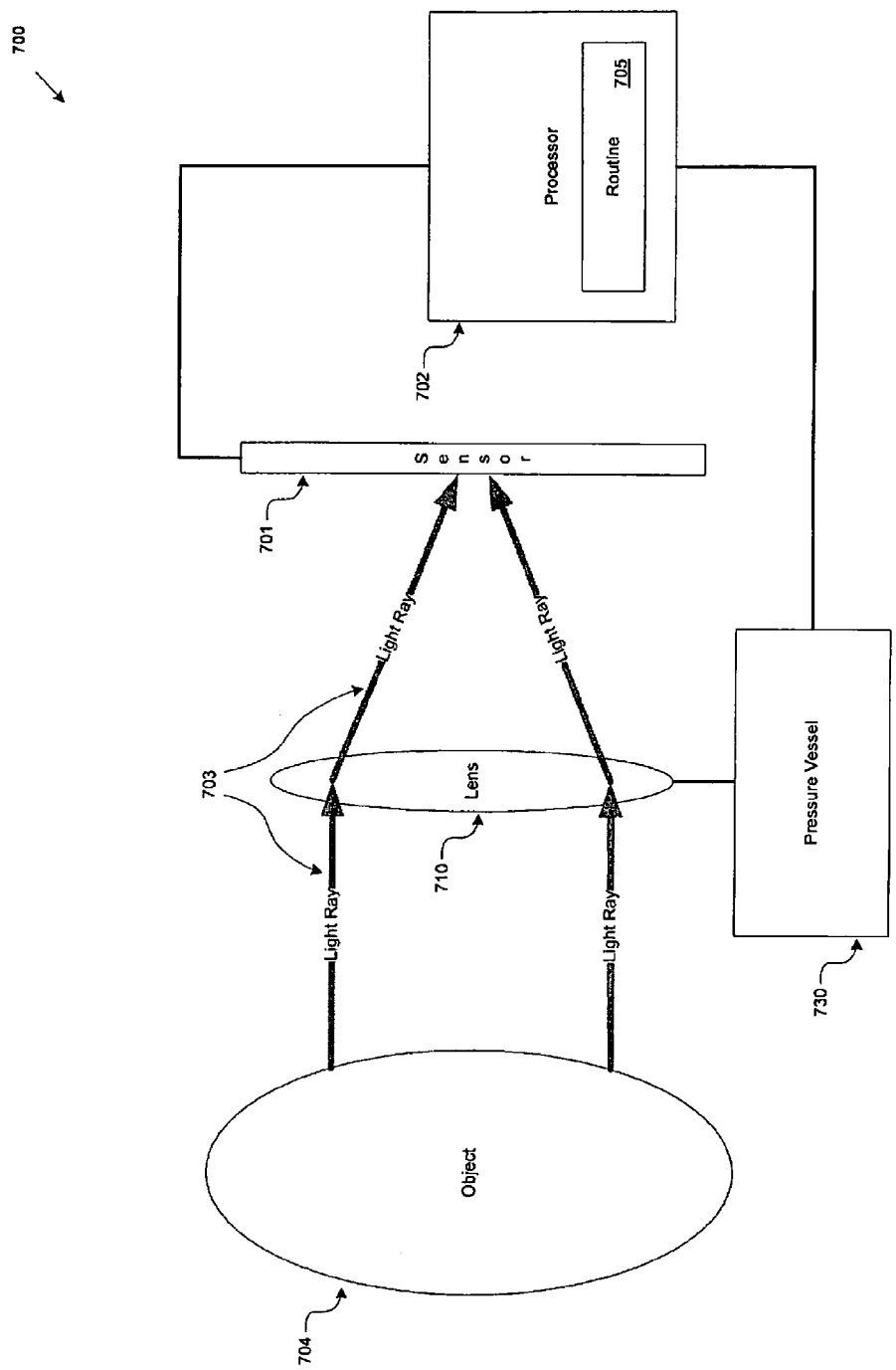
FIG. 7 depicts a sensor and processor system for determining a target focus volume in accordance with one embodiment of the invention.

The apparatus 200 may determine the target focus volume(s) 612 or 614 and/or 622 or 624 using one of numerous methods. For example, FIG. 7 depicts a sensor and processor system 700 for determining a target focus volume in accordance with one embodiment of the invention. According to FIG. 7, an image sensor 701 is coupled to a (signal) processor 702. The processor 702 is coupled to a pressure vessel 730 that drives a fluidic medium in to and out of a fluidic lens 710. Light waves 703 (shown as rays) from an object 704 pass through the lens 710 and eventually reach the sensor 701.

The lens 710 is typically representative of a combination of lenses, such as lens 210 and lens 220 of FIG. 2. The sensor 701 sends a value related to the light waves 703 to the processor 702, which determines, via a routine 705 whether the object 704 associated with the light waves 703 is in focus. If the routine 705 determines that the object 704 is out of focus, the processor 702 sends a signal to pressure vessel 730 (or control mechanism of the pressure vessel 730) that instructs the pressure vessel 730 to drive fluidic medium in to or out of the lens 710 in accordance with a volume needed to reach a desired focus of the object 704.

The sensor 701 can be a CMOS or CCD sensor on which the image of the object is projected. The processor 702 analyzes the output of the image sensor pixel by pixel to determine the state of focus. By way of example, the processor 702 may perform a Fast Fourier Transform (FFT) of output signals from all or select portions of the pixels of the sensor 701. If the image is in focus, the FFT will display many signals at high spatial frequencies. If the image is out of focus, then most signals will be concentrated at the lower spatial frequencies. By comparing the FFT spectrum at each state of the lens, one can determine how well the image is focused.

The output from the processor 702 controls the state of one or more tunable lens. For example, the output may control the pressure vessel 730 (or the control mechanism of the pressure vessel 730), which in turn controls the volume of the fluidic medium in the tunable element.

In most applications, focusing must be accomplished within a fraction of a second. This means that the processor 702 may be unable or may not need to process the outputs from the entire sensor 701. Under these circumstances, the processor 702 may process only select portions of the sensor 701 (e.g., the central portion of the sensor 701, as it is often the most important portion in relation to focusing an image). Alternative approaches also include processing the central portion and peripheral portions of the sensor 701. Under these approaches, different weighting factors may be assigned to processing of signals from these portions of the sensor 701 in order to determine an optimal state of focus for an image.

After determining the target focus volume(s) 612 or 614 and/or 622 or 624, the apparatus 200 adjusts the volume of the fluidic medium in the first lens 210 and/or the second lens 220 in accordance with the steps 510-560 of the process 500. For example, during step 530 the apparatus 200 may use one of three approaches for changing the volume of the fluidic medium in the first lens 610 by the total target focus volume 612.

Figure 8C:
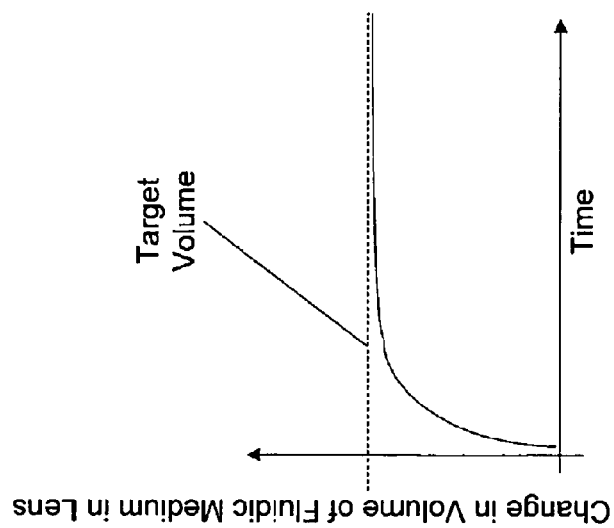
FIG. 8C illustrates a graph showing the change over time of an overall increase in volume of the fluidic medium relative to a target focus volume in accordance with a second approach for effecting focus.
Figure 8B:
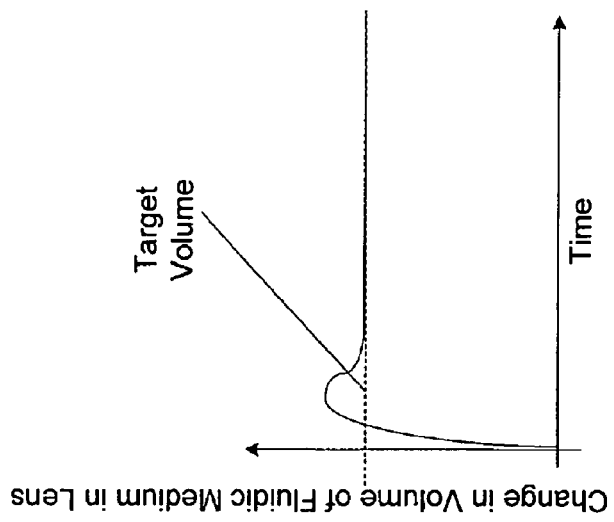
FIG. 8B illustrates a graph showing the change over time of an overall increase in volume of the fluidic medium relative to a target focus volume in accordance with a second approach for effecting focus.
Figure 8A:
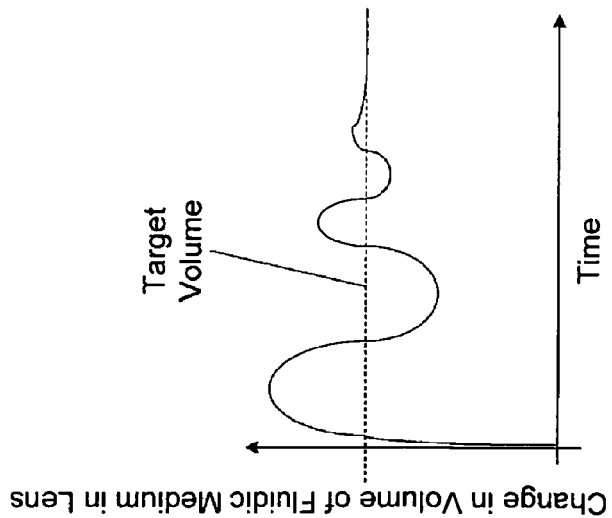
FIG. 8A illustrates a graph showing the change over time of an overall increase in volume of the fluidic medium relative to a target focus volume in accordance with a first approach for effecting focus.

Under a first approach, the apparatus 200 alternates increasing and decreasing the volume of the fluidic medium by amounts over and under the target focus volume 612 until the overall increase in volume of the fluidic medium equals the target focus volume 612. By way of example, FIG. 8A illustrates a graph showing the change over time of the overall increase in volume of the fluidic medium relative to the target focus volume 612 in accordance with the first approach.

Under a second approach, the apparatus 200 increases the volume of the fluidic medium by an amount greater than the target focus volume 612, and then gradually decreases the volume of the fluidic medium until the overall increase in volume of the fluidic medium reaches the target focus volume 612. By way of example, FIG. 8B illustrates a graph showing the change over time of the overall increase in volume of the fluidic medium relative to the target focus volume 612 in accordance with the second approach.

Under a third approach, the apparatus 200 increases the volume of the fluidic medium by an amount less than the target focus volume 612, and then gradually increases the volume of the fluidic medium until the overall increase in volume of the fluidic medium reaches the target focus volume 612. By way of example, FIG. 8C illustrates a graph showing the change over time of the overall increase in volume of the fluidic medium relative to the target focus volume 612 in accordance with the third approach.

One of skill in the art will appreciate alternative but similar processes to those described with respect to FIGS. 3-8 for effecting zoom in and focus of an object.

Figure 9:
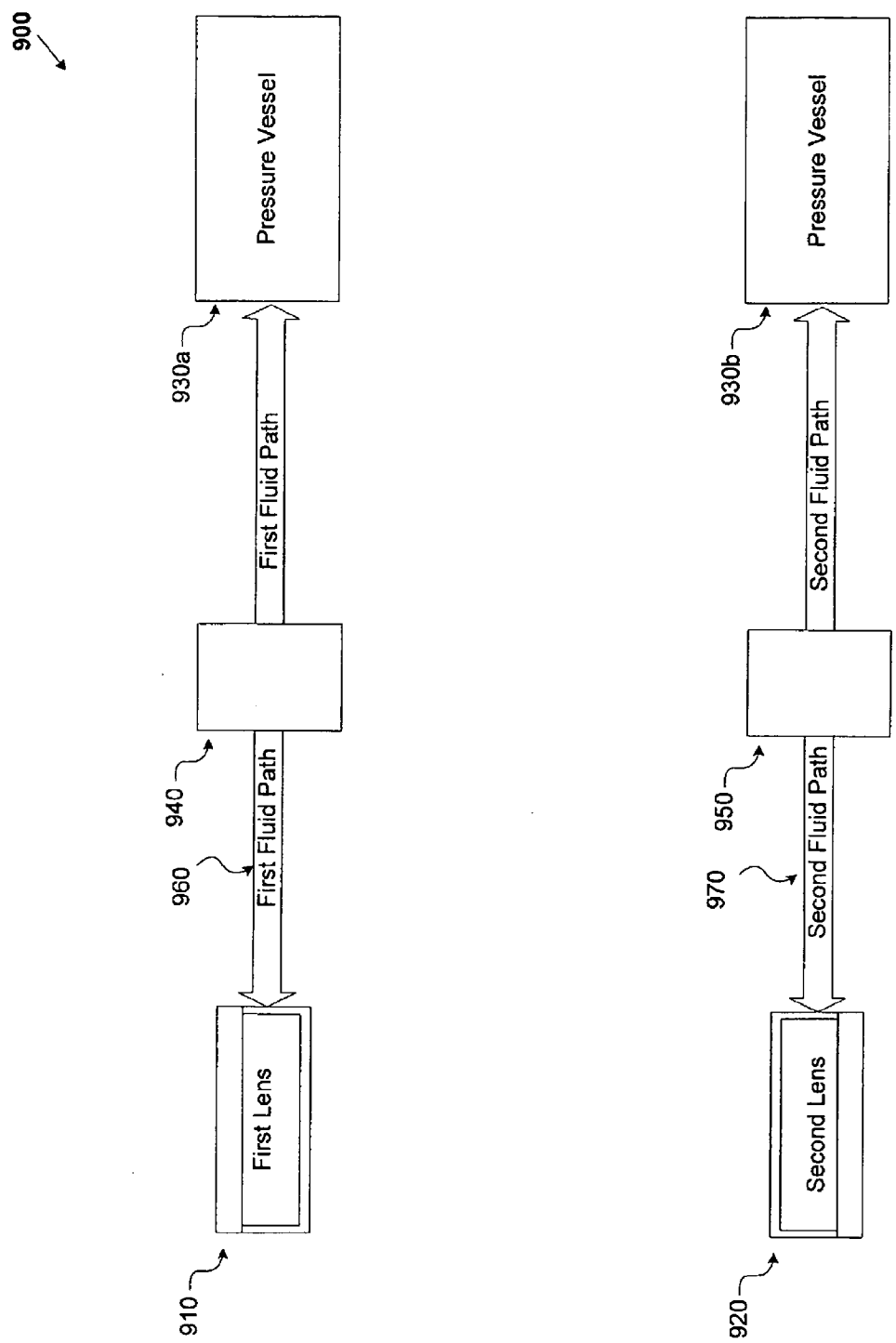
FIG. 9 depicts a fluidic lens apparatus in accordance with one embodiment of the invention.

Attention is now drawn to FIG. 9, which depicts a fluidic lens apparatus 900 in accordance with one embodiment of the invention. As shown, a first lens 910 is in fluid communication with a first pressure vessel 930a, and a second lens 920 is in fluid communication with a second pressure vessel 930b. The design of the apparatus 900 is advantageous over the design of apparatus 200 shown in FIG. 2 because it allows for simultaneous zoom and/or focus of the first lens 910 and the second lens 920, which results in a quicker response time with respect to zooming and/or focusing of an image. On the other hand, the design of the apparatus 200 is advantageous over the design of the apparatus 900 because it requires less components (e.g., a single pressure vessel 230 versus two pressure vessels 930a and b), which results in lower manufacturing costs and a reduced risk of mechanical error.

Figure 10:
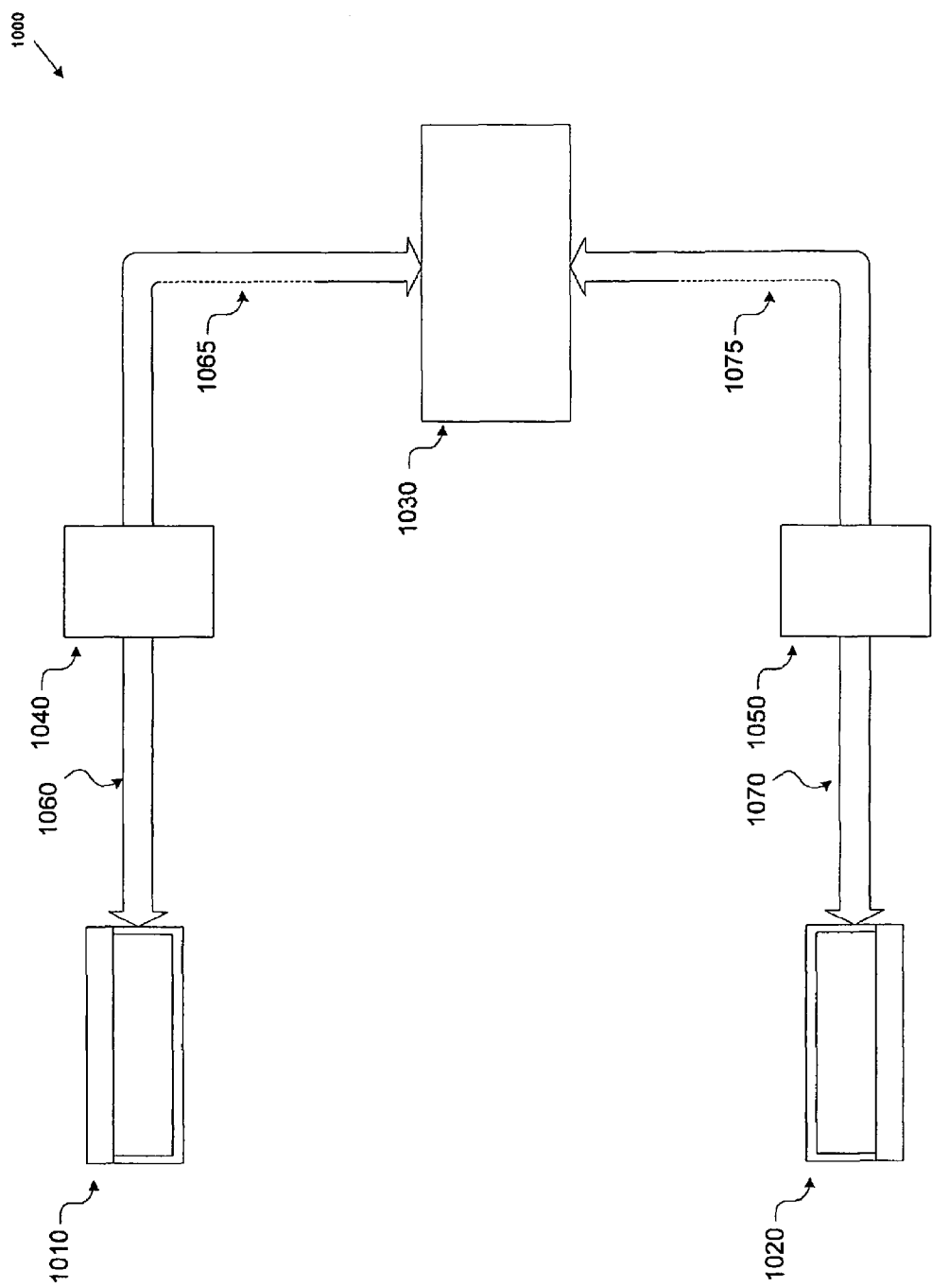
FIG. 10 depicts a fluidic lens apparatus in accordance with one embodiment of the invention.

Attention is now drawn to FIG. 10, which depicts a fluidic lens apparatus 1000 in accordance with one embodiment of the invention. As shown, the apparatus 1000 comprises a first lens 1010, a second lens 1020, a pressure vessel 1030, a first valve 1040, a second valve 1050, a first fluid path 1060 which is configured with a first flexible wall 1065, and a second fluid path 1070 which is configured with a second flexible wall 1075. The walls 1065 and 1075 are formed from material that allows the walls to expand or contract with a respective increase or decrease in fluid pressure. One of skill in the art will appreciate that the walls 1065 and 1075 may be formed from any suitable elastic material.

In one embodiment, the elasticity of the walls 1065 and 1075 is preferred to be less than the elasticity of the lens membranes of the first lens 1010 and the second lens 1020, respectively. Accordingly, when the first valve 1040 is open and the pressure vessel 1030 applies positive or negative pressure to the first fluid path 1060, the lens membrane of the first lens 1010 expands or contracts, respectively, instead of the first wall 1065. When the first valve 1040 is closed, the second valve 1050 is open, and the pressure vessel 1030 applies positive or negative pressure to the second fluid path 1070, the lens membrane of the second lens 1020 expands or contracts, respectively, and the first wall 1065 contracts or expands, respectively.

One of skill in the art will recognize that the apparatus 1000 is a closed system that is designed so that no additional fluidic medium is necessary during the application of pressure by the pressure vessel 1030 to the fluid paths 1060 and 1070. One of skill in the art will also recognize that the elasticity of the walls 1065 and 1075 need not be less than the elasticity of the lens membranes of the lenses 1010 and 1020, respectively.

Figure 11:
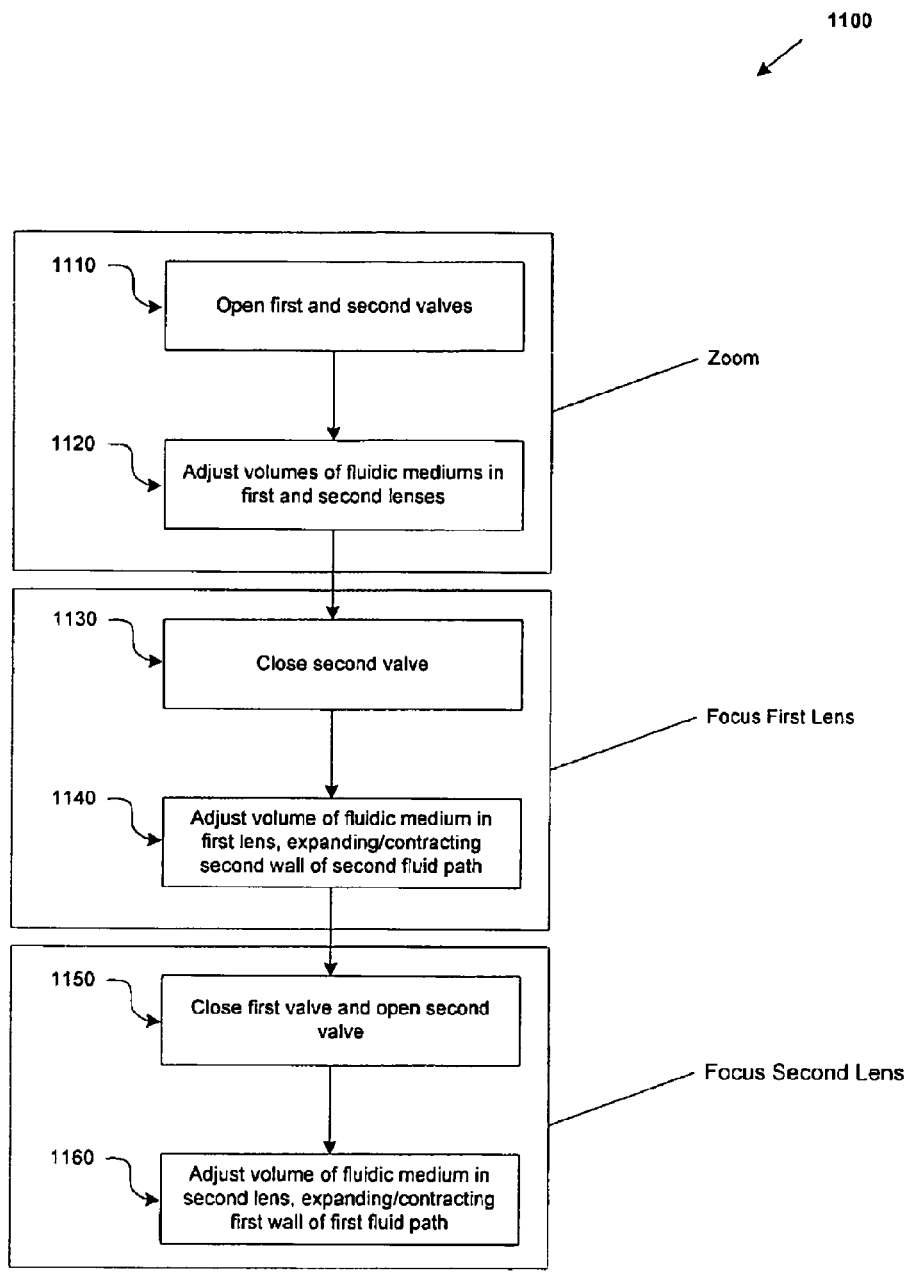
FIG. 11 a process flow diagram illustrating steps taken by a fluidic lens apparatus during a process for effecting zoom and focus in accordance with one implementation of the invention.

Attention is now drawn to FIG. 11, which shows a process flow diagram illustrating steps taken by the apparatus 1000 during a process 1100 for effecting zoom and focust hrough cooperative use of the lenses 1010 and 1020 in accordance with one implementation of the invention. While referring to FIG. 11, simultaneous reference will be made to FIG. 10. One of skill in the art will appreciate that one or more of steps 1110-1160 may be rearranged or omitted.

As shown, the first valve 1040 and the second valve 1050 are opened (step 1110), and the volumes of the fluidic mediums in the first and second lenses 1010 and 1020 are adjusted (step 1120). The second valve 1050 is closed (step 1130), and the volume of the fluidic medium in the first lens 1010 is adjusted, resulting in an expansion or contraction of the second wall 1075 (step 1140). The first valve 1040 is then closed and the second valve 1050 is opened (step 1150), and the volume of the fluidic medium in the second lens 1020 is adjusted, resulting in an expansion or contraction of the first wall 1065 (step 1160). One of skill in the art will appreciate that, depending on the configuration of the pressure vessel 1030, steps 1110 and 1120 can be replaced by steps similar to the steps 310-360 of FIG. 3.

Figure 12:
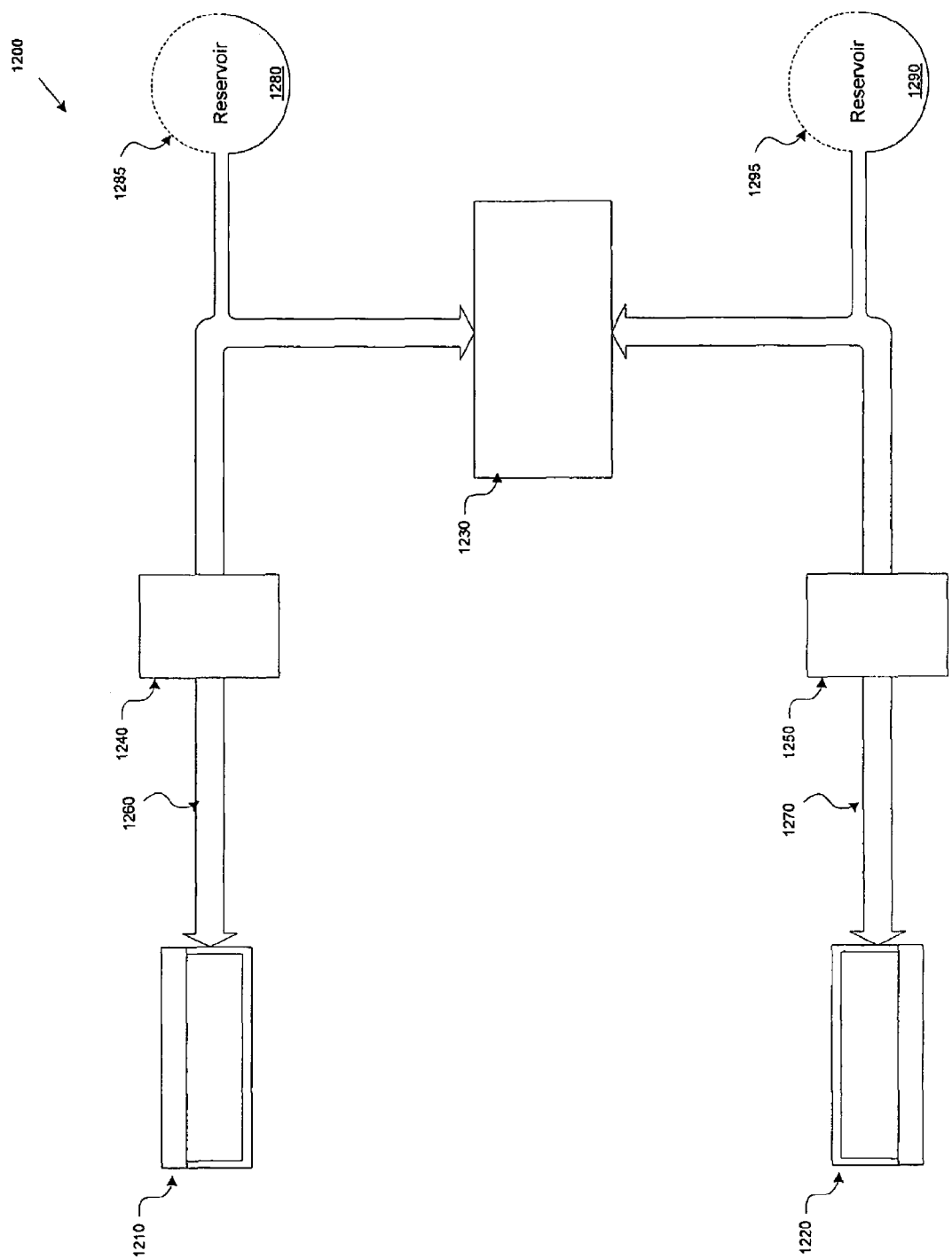
FIG. 12 depicts a fluidic lens apparatus in accordance with one embodiment of the invention.

Attention is now drawn to FIG. 12, which depicts a fluidic lens apparatus 1200 in accordance with one embodiment of the invention. As shown, the apparatus 1200 comprises a first lens 1210, a second lens 1220, a pressure vessel 1230, a first valve 1240, a second valve 1250, a first fluid path 1260, a second fluid path 1270, a first reservoir 1280 which is configured with a first flexible wall 1285, and a second reservoir 1290 which is configured with a second flexible wall 1295. The walls 1285 and 1295 are formed from material that allows the walls to expand or contract with a respective increase or decrease in fluid pressure. One of skill in the art will appreciate that the walls 1285 and 1295 may be formed from any suitable elastic material.

In one embodiment, the elasticity of the walls 1285 and 1295 is less than the elasticity of the lens membranes of the first lens 1210 and the second lens 1220, respectively. Accordingly, when the first valve 1240 is open and the pressure vessel 1230 applies positive or negative pressure to the first fluid path 1260, the lens membrane of the first lens 1210 expands or contracts, respectively, instead of the first wall 1285. When the first valve 1240 is closed, the second valve 1250 is open, and the pressure vessel 1230 applies positive or negative pressure to the second fluid path 1270, the lens membrane of the second lens 1220 expands or contracts, respectively, and the first wall 1285 of the first reservoir 1280 contracts or expands, respectively.

One of skill in the art will also recognize that the elasticity of the walls 1285 and 1295 need not be less than the elasticity of the lens membranes of the lenses 1210 and 1220, respectively.

Figure 13:
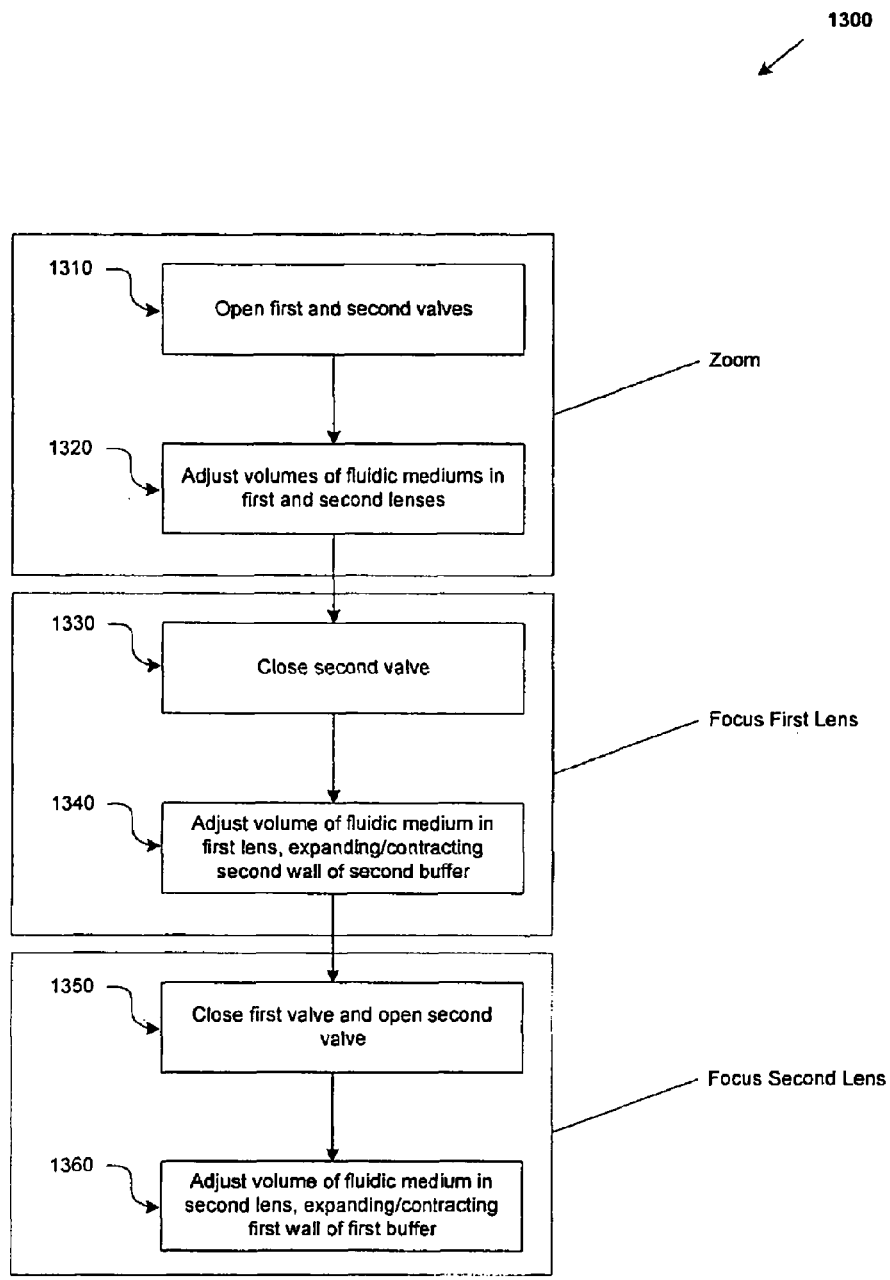
FIG. 13 shows a process flow diagram illustrating steps taken by a fluidic lens apparatus during a process for effecting zoom and focus in accordance with one implementation of the invention.

Attention is now drawn to FIG. 13, which shows a process flow diagram illustrating steps taken by the apparatus 1200 during a process 1300 for effecting zoom and focus through cooperative use of the lenses 1210 and 1220 in accordance with one implementation of the invention. While referring to FIG. 13, simultaneous reference will be made to FIG. 12. One of skill in the art will appreciate that one or more of steps 1310-1360 may be rearranged or omitted.

As shown, the first valve 1240 and the second valve 1250 are opened (step 1310), and the volumes of the fluidic mediums in the first and second lenses 1210 and 1220 are adjusted (step 1320). The second valve 1250 is closed (step 1330), and the volume of the fluidic medium in the first lens 1210 is adjusted, resulting in an expansion or contraction of the second wall 1295 (step 1340). The first valve 1240 is then closed and the second valve 1250 is opened (step 1350), and the volume of the fluidic medium in the second lens 1220 is adjusted, resulting in an expansion or contraction of the first wall 1285 (step 1360). One of skill in the art will appreciate that, depending on the configuration of the pressure vessel 1230, steps 1310 and 1320 can be replaced by steps similar to the steps 310-360 of FIG. 3.

Figure 14:
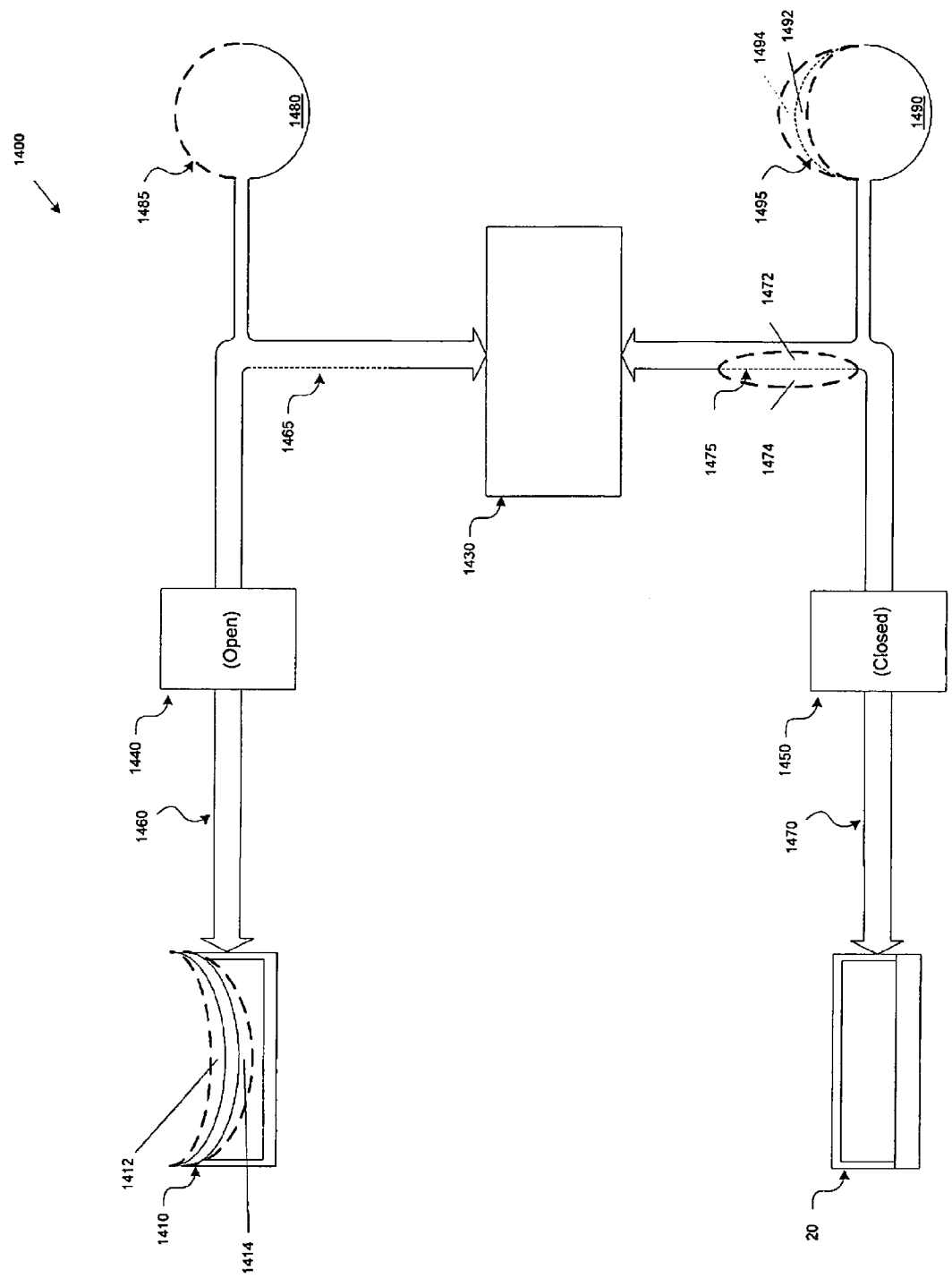
FIG. 14 depicts a fluidic lens apparatus in accordance with one embodiment of the invention.

Attention is now drawn to FIG. 14, which depicts a fluidic lens apparatus 1400 in accordance with one embodiment of the invention. As shown, the apparatus 1400 comprises a first lens 1410, a second lens 1420, a pressure vessel 1430, a first valve 1440, a second valve 1450, a first fluid path 1460 which is configured with an optional first flexible wall 1465, a second fluid path 1470 which is configured with an optional second flexible wall 1475, an optional first reservoir 1480 which is configured with a first flexible wall 1485, and an optional second reservoir 1490 which is configured with a second flexible wall 1495. The walls 1465, 1475, 1485 and/or 1495 are formed from material that allows the walls to expand or contract with a respective increase or decrease in fluid pressure. One of skill in the art will appreciate that the walls 1465, 1475, 1485 and/or 1495 may be formed from any suitable elastic material.

The elasticity of the first wall 1465 and/or the first wall 1485 is less than the elasticity of the lens membrane of the first lens 1410, which ensures that the lens membrane of the first lens 1410 expands or contracts instead of the first wall 1465 and/or the first wall 1485 when the first valve 1440 is open and the pressure vessel 1430 applies positive or negative pressure to the first fluid path 1460. The elasticity of the second wall 1475 and/or the second wall 1495 is less than the elasticity of the lens membrane of the second lens 1420, which ensures that the lens membrane of the second lens 1420 expands or contracts instead of the second wall 1475 and/or the second wall 1495 when the second valve 1450 is open and the pressure vessel 1430 applies positive or negative pressure to the second fluid path 1470.

By way of example, FIG. 14 illustrates the potential for expansion or contraction of a lens membrane of the first lens 1410, and the respective contraction or expansion of the second wall 1475 and/or the second wall 1495. As shown, when the first valve 1440 is open, the second valve 1450 is closed and the pressure vessel 1430 applies positive or negative pressure to the first fluid path 1460, the lens membrane of the first lens 1410 expands or contracts by a first expansion volume 1412 or a first contraction volume 1414, respectively.

In one embodiment, the second wall 1475 contracts or expands by a second contraction volume 1472 or a second expansion volume 1474, respectively. Accordingly, the first expansion volume 1412 equals the second contraction volume 1472, and the first contraction volume 1414 equals the second expansion volume 1474.

In another embodiment, the second wall 1495 contracts or expands by a second contraction volume 1492 or a second expansion volume 1494, respectively. Accordingly, the first expansion volume 1412 equals the second contraction volume 1492, and the first contraction volume 1414 equals the second expansion volume 1494.

In yet another embodiment, both the second wall 1475 and the second wall 1495 contract or expand by a total shared volume of equal to the first expansion volume 1412 or the first contraction volume 1414, respectively.

Figure 15:
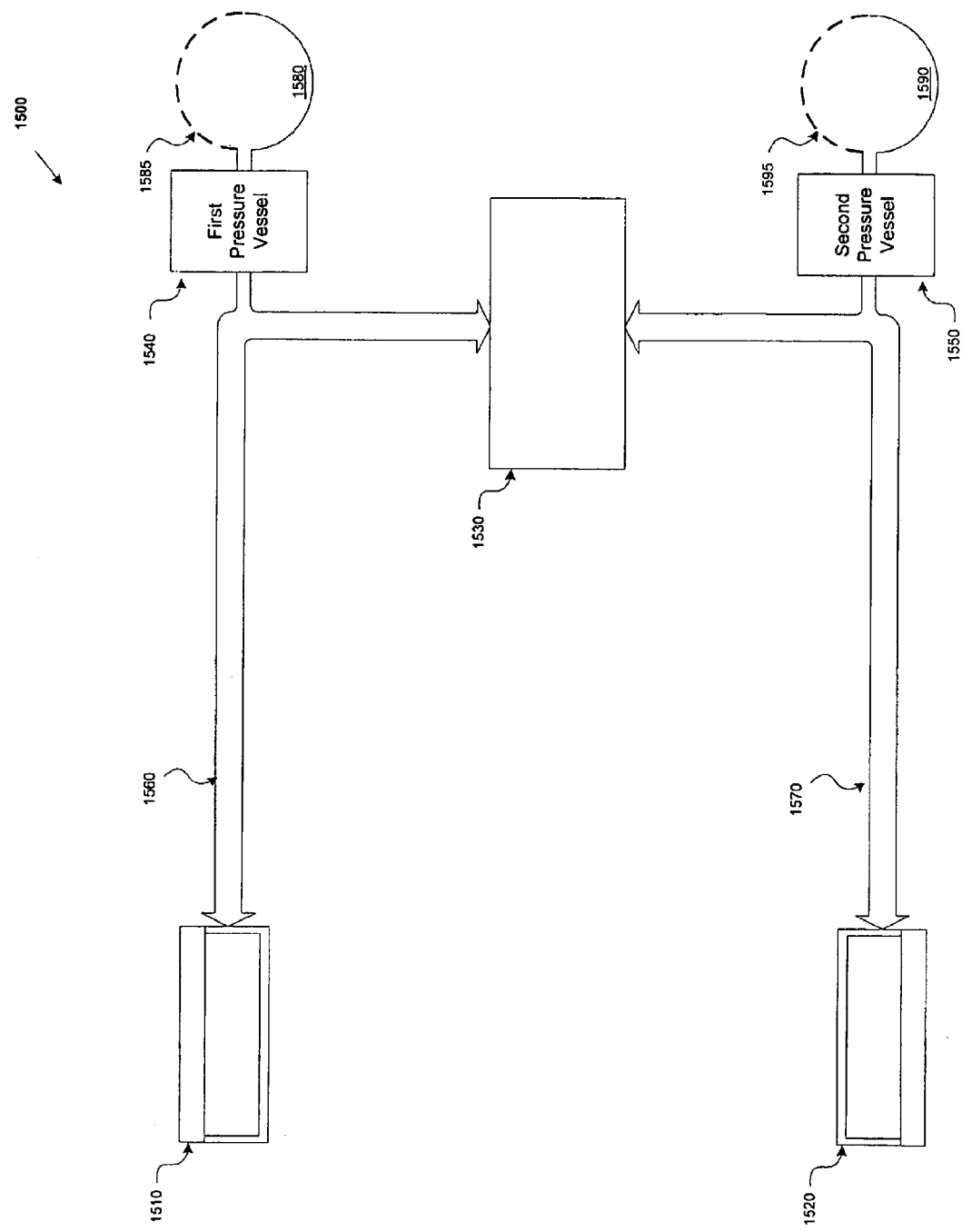
FIG. 15 depicts a fluidic lens apparatus in accordance with one embodiment of the invention.

Attention is now drawn to FIG. 15, which depicts a fluidic lens apparatus 1500 in accordance with one embodiment of the invention. As shown, the apparatus 1500 comprises a first lens 1510, a second lens 1520, a primary pressure vessel 1530, a first pressure vessel 1540, a second pressure vessel 1550, a first fluid path 1560, a second fluid path 1570, a first reservoir 1580 which is configured with a first flexible wall 1585, and a second reservoir 1590 which is configured with a second flexible wall 1595. The walls 1585 and 1595 are formed from material that allows the walls to expand or contract with a respective increase or decrease in fluid pressure. One of skill in the art will appreciate that the walls 1585 and 1595 may be formed from any suitable elastic material.

The primary pressure vessel 1530 is configured to apply positive or negative pressure to both of the fluid paths 60 and 70. The first pressure vessel 1540 is configured to apply positive or negative pressure to the first fluid path 60, and the second fluid path 70 is configured to apply positive or negative pressure to the second fluid path 70.

Figure 16:
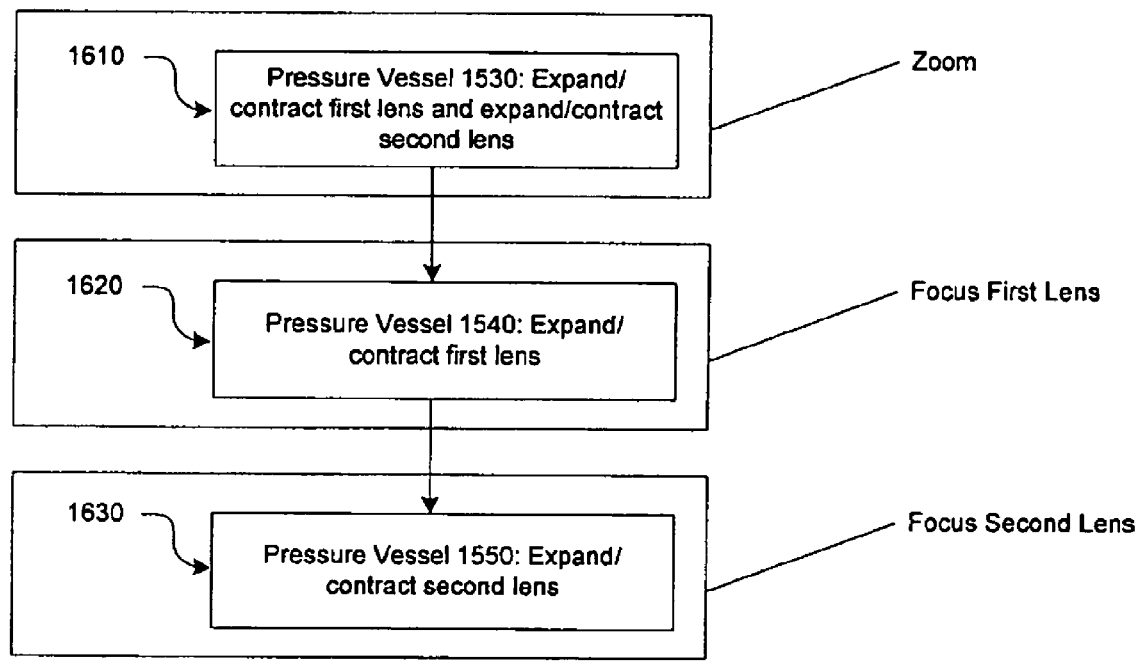
FIG. 16 shows a process flow diagram illustrating steps taken by a fluidic lens apparatus during a process for effecting zoom and focus in accordance with one implementation of the invention.

Attention is now drawn to FIG. 16, which shows a process flow diagram illustrating steps taken by the apparatus 1500 during a process 1600 for effecting zoom and focus in accordance with one implementation of the invention. While referring to FIG. 16, simultaneous reference will be made to FIG. 15. One of skill in the art will appreciate that one or more of steps 1610-1630 may be rearranged or omitted.

As shown during a zoom process, the pressure vessel 1530 adjusts the volumes of the fluidic mediums in the first lens 1510 and the second 1520 (step 1610). During a focus process, the pressure vessel 1540 adjusts the volume of the fluidic medium in the first lens 1510 (step 16 20) and the pressure vessel 1550 adjusts the volume of the fluidic medium in the second lens 1520 (step 1630).

Figure 17:
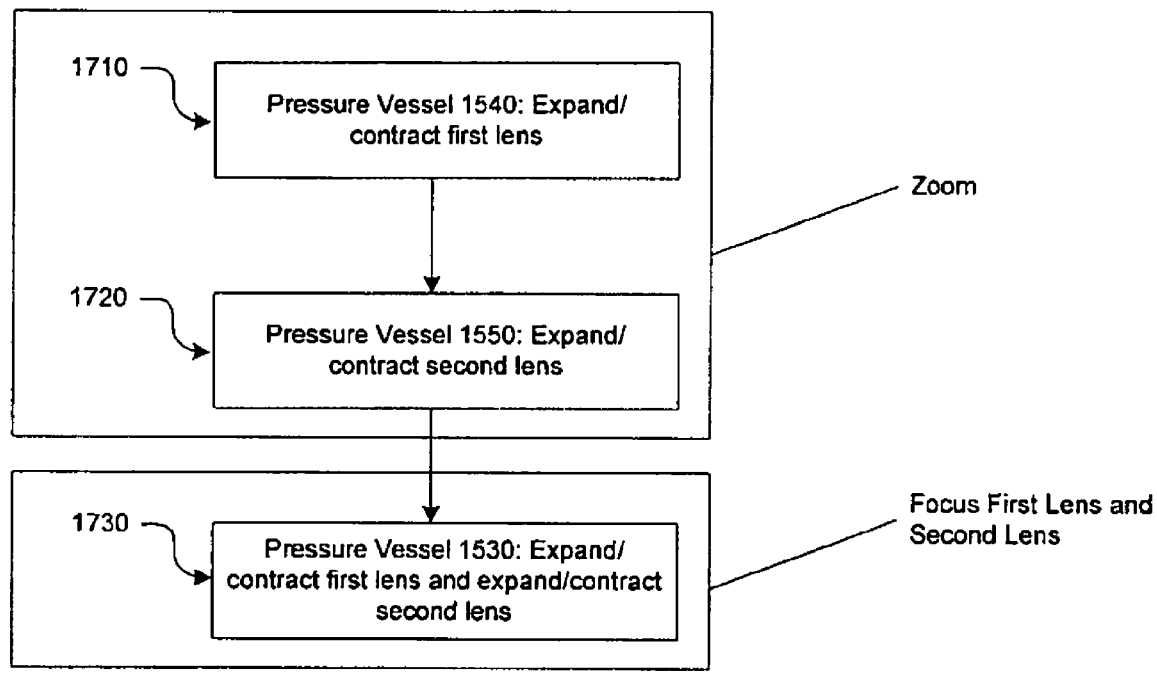
FIG. 17 shows a process flow diagram illustrating steps taken by a fluidic lens apparatus during a process for effecting zoom and focus in accordance with one implementation of the invention.

Attention is now drawn to FIG. 17, which shows a process flow diagram illustrating steps taken by the apparatus 1500 during a process 1700 for effecting zoom and focus through cooperative use of the lenses 1510 and 1520 in accordance with one implementation of the invention. While referring to FIG. 17, simultaneous reference will be made to FIG. 15. One of skill in the art will appreciate that one or more of steps 1710-1730 may be rearranged or omitted.

As shown during a zoom process, the pressure vessels 1540 and 1550 adjust the volume of the fluidic medium in the first lens 1510 and the second 1520, respectively (steps 1710-1720). During a focus process, the pressure vessel 1550 adjusts the volumes of the fluidic mediums in the first lens 1510 and the second lens 1520 (step 1730).

Figure 18:
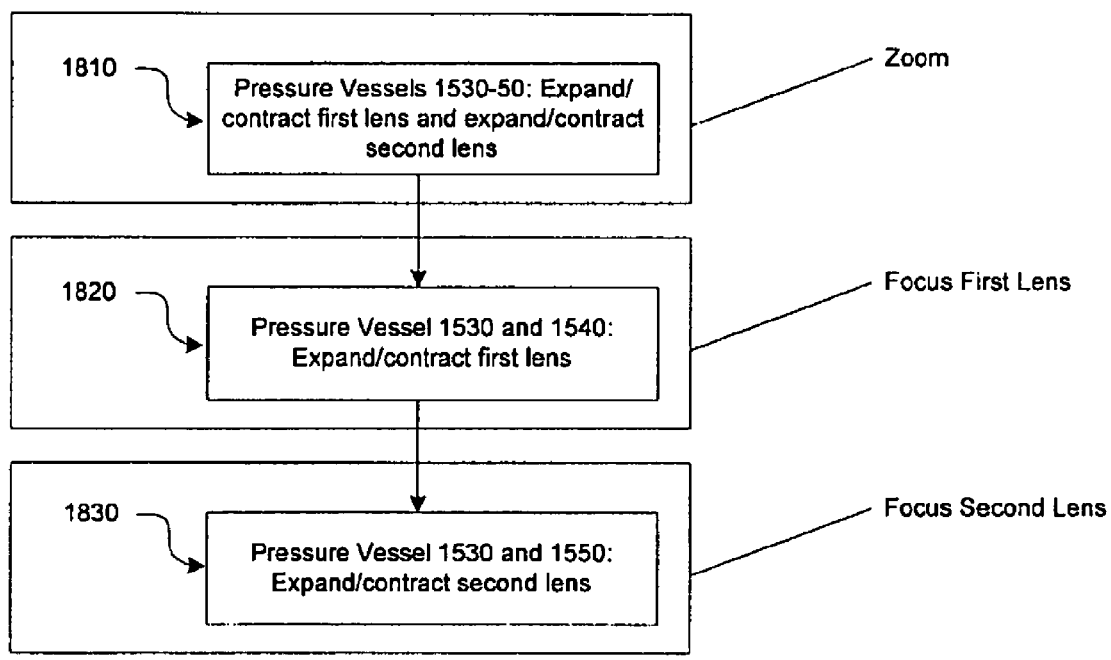
FIG. 18 shows a process flow diagram illustrating steps taken by the apparatus during a process for effecting zoom and focus in accordance with one implementation of the invention.

Attention is now drawn to FIG. 18, which shows a process flow diagram illustrating steps taken by the apparatus 1500 during a process 1800 for effecting zoom and focus in accordance with one implementation of the invention. While referring to FIG. 18, simultaneous reference will be made to FIG. 15. One of skill in the art will appreciate that one or more of steps 1810-1830 may be rearranged or omitted.

As shown during a zoom process, the pressure vessels 1530 and 1540 adjust the volume of the fluidic medium in the first lens 1510 and the pressure vessels 1530 and 1540 adjust the volume of the fluidic medium in the second 1520 (step 1810). During a focus process, the pressure vessels 1530 and 1540 adjust the volume of the fluidic medium in the first lens 1510 (step 18 20) and the pressure vessels 1530 and 1550 adjust the volume of the fluidic medium in the second lens 1520 (step 1830).

Figure 19C:
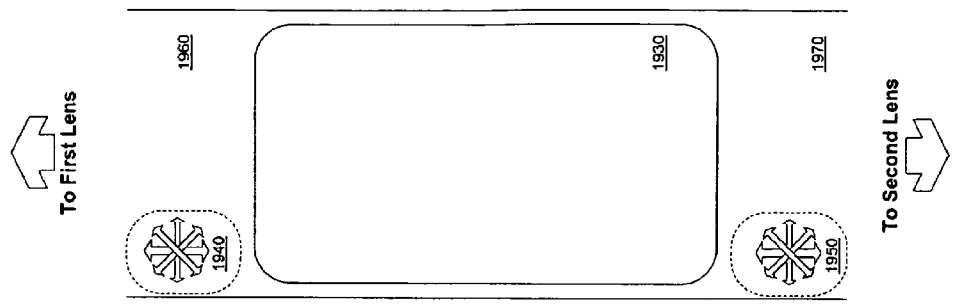
FIG. 19C depicts a pressure vessel that includes one or more variable volume elements positioned within one or more fluid pathways.
Figure 19B:
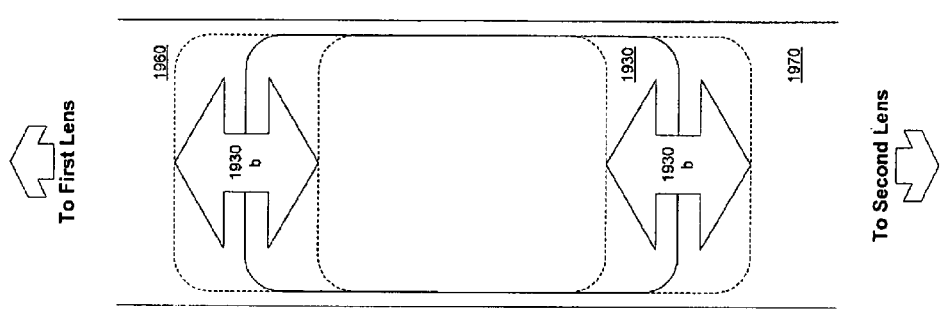
FIG. 19B depicts a pressure vessel that is configured to vary its volume within one or more fluid pathways in one or more directions.
Figure 19A:
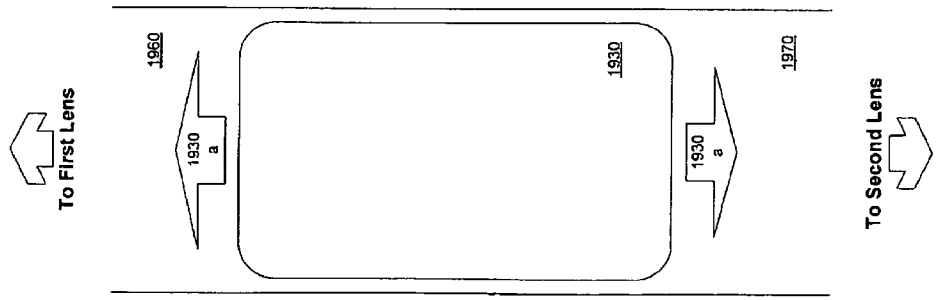
FIG. 19A depicts a pressure vessel that is configured to travel within one or more fluid pathways in one or more directions $1930a$.

Attention is now drawn to FIGS. 19A-C, each of which illustrate a configuration of an optically clear pressure vessel 1930 in accordance with one or more embodiments of the invention.

As shown in FIG. 19A, the pressure vessel 1930 may be configured to travel within fluid pathways 1960 and 1970 in one or more directions 1930a. As shown in FIG. 19B, the pressure vessel 1930 may be configured to vary its volume within the fluid pathways 1960 and 1970 in one or more directions 30b. As shown in FIG. 19C, the pressure vessel 1930 may include one or more variable volume elements ("VVE") (e.g., VVE 1940 and VVE 1950) positioned within the fluid pathways 1960 and 1970. The VVE 1940 and the VVE 1950 may be configured to expand or contract their volumes within fluid pathways 1960 and 1970, respectively.

One of skill in the art will appreciate that the pressure vessel 1930 may be configured using any combination of the configurations shown in FIGS. 19A-C. For example, the pressure vessel 1930 may be configured to travel within the fluid pathway 1940 in one or more directions 1930a, vary its volume within the fluid pathway 1940 in one or more directions 30b, and/or include one or more VVE's (e.g., VVE 1940 and VVE 1950).

Attention is now drawn to FIGS. 20A-F, each of which illustrate a configuration of a fluidic lens apparatus 2000 in accordance with one or more embodiments of the invention. As shown in FIG. 20A, an optical channel 2001 is formed between a first lens membrane 2010 and a second lens membrane 2020. An optically clear control mechanism 2030 is positioned within the optical channel 2001.

As shown in FIG. 20B, the control mechanism 2030 may be configured to travel within the optical channel 2001 in one or more directions 2030a. FIG. 20B illustrates, by way of example, an instance of the apparatus 2000 after the control mechanism 2030 has traveled towards the first lens membrane 2010. As shown in FIG. 20B, the movement of the control mechanism 2030 applied positive pressure to the first lens membrane 2010, which caused the first lens membrane 2010 to expand. Also as shown in FIG. 20B, the movement of the control mechanism 2030 applied negative pressure to the second lens membrane 2020, which caused the second lens membrane 2020 to contract.

As shown in FIG. 20C, the control mechanism 2030 may be configured to vary its volume within the optical channel 2001 in one or more directions 2030b. FIG. 20C illustrates, by way of example, an instance of the apparatus 2000 after the volume of the control mechanism 2030 has expanded towards the first lens membrane 2010. As shown in FIG. 20C, the expansion of the control mechanism 2030 applied positive pressure to the first lens membrane 2010, which caused the first lens membrane 2010 to expand.

As shown in FIG. 20D, an optical channel 2001 is formed between a first lens membrane 2010 and a second lens membrane 2020. Two optically clear control mechanisms 2030i and 2030ii are positioned within the optical channel 2001.

As shown in FIG. 20E, the control mechanisms 2030i and 2030ii may be configured to travel within the optical channel 2001 in one or more directions 2030a. FIG. 20E illustrates, by way of example, an instance of the apparatus 2000 after the control mechanism 2030i has traveled towards the first lens membrane 2010, and after the control mechanism 2030ii has traveled toward the second lens membrane 2020. As shown in FIG. 20E, the movement of the control mechanism 2030i applied positive pressure to the first lens membrane 2010, which caused the first lens membrane 2010 to expand. Also as shown in FIG. 20E, the movement of the control mechanism 2030ii applied positive pressure to the second lens membrane 2020, which caused the second lens membrane 2020 to expand.

As shown in FIG. 20F, the control mechanisms 2030i and 2030ii may be configured to vary their volumes within the optical channel 2001 in one or more directions 2030b. FIG. 20F illustrates, by way of example, an instance of the apparatus 2000 after the volumes of the control mechanisms 2030i and 2030ii have expanded towards the first lens membrane 2010 and the second lens membrane 2020, respectively. As shown in FIG. 20F, the expansion of the control mechanism 2030i applied positive pressure to the first lens membrane 2010, which caused the first lens membrane 2010 to expand. Also as shown in FIG. 20F, the expansion of the control mechanism 2030ii applied positive pressure to the second lens membrane 2020, which caused the second lens membrane 2020 to expand.

Figure 21:
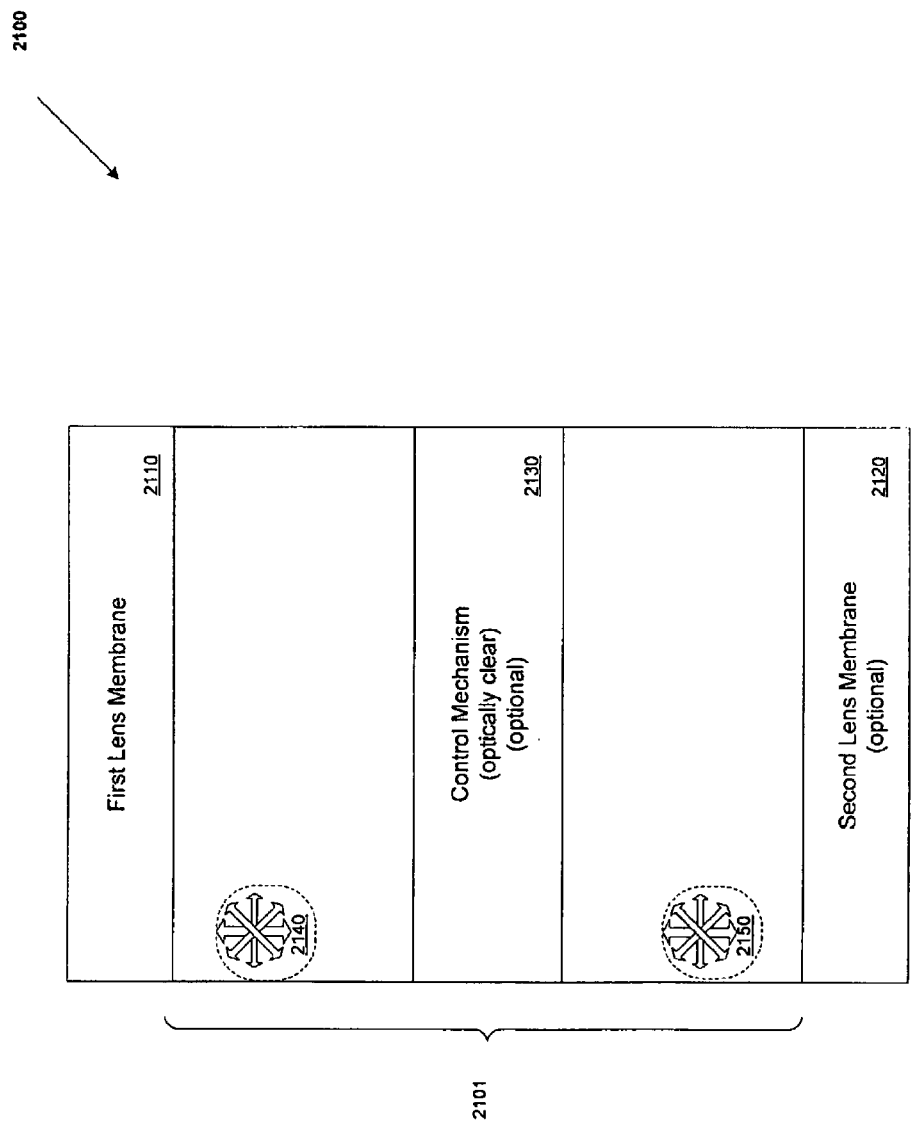
FIG. 21 illustrates a configuration of a fluidic lens apparatus in accordance with one embodiment of the invention.

Attention is now drawn to FIG. 21, which illustrates a configuration of a fluidic lens apparatus 2100 in accordance with one or more embodiments of the invention. As shown in FIG. 21, an optical channel 2101 is formed between a first lens membrane 2110 and a second lens membrane 2120. An optically clear control mechanism 2130 is positioned within the optical channel 2101. The control mechanism 2130 may be configured to travel within the optical channel 2101 or vary its volume within the optical channel 2101. As shown in FIG. 21, the optical channel 2101 may include one or more variable volume elements ("VVE") (e.g., VVE 2140 and VVE 2150) that are configured to independently expand or contract their volumes within the optical channel 2101. The VVE 2140 and the VVE 2150 are preferably positioned within the optical channel 2101 so that they do not obstruct an optical path between the first lens membrane 2110 and the second lens membrane 2120.

Figure 22:
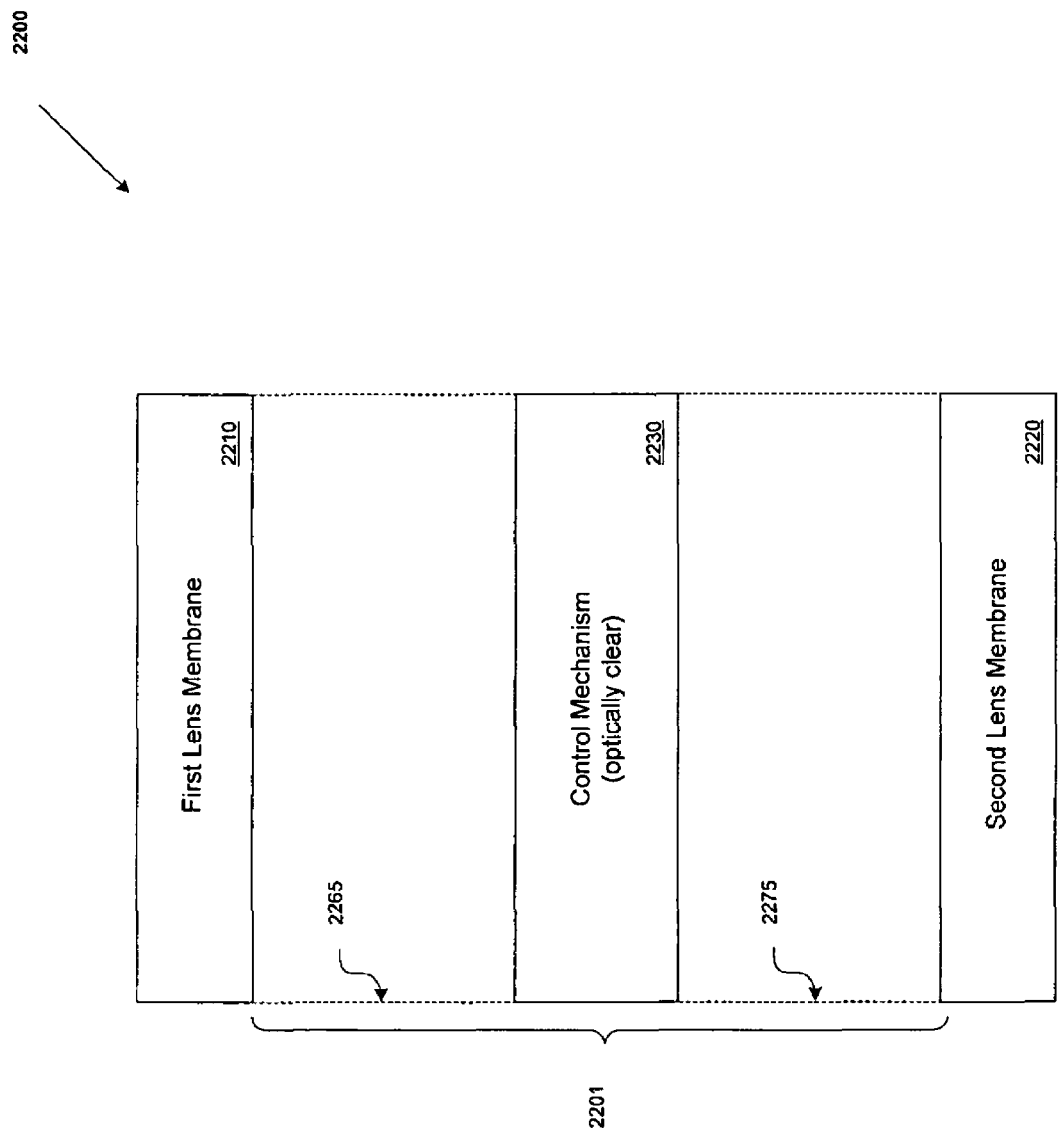
FIG. 22 illustrates a configuration of a fluidic lens apparatus in accordance with one embodiment of the invention.

Attention is now drawn to FIG. 22, which illustrates a configuration of a fluidic lens apparatus 2200 in accordance with one or more embodiments of the invention. As shown in FIG. 22, an optical channel 2201 is formed between a first lens membrane 2210 and a second lens membrane 2220. An optically clear control mechanism 2230 is positioned within the optical channel 2201. The control mechanism 2230 may be configured to travel within the optical channel 2201 or vary its volume within the optical channel 2201. As shown in FIG. 22, the optical channel 2201 may include one or more elastic walls 2265 and 2275 that can independently apply positive or negative pressure to the first lens membrane 2210 and the second lens membrane 2220, respectively. One of skill in the art will appreciate that the walls 2265 and 2275 may be formed from any suitable elastic material.

The walls 2265 and 2275 may be configured in any manner suitable for applying positive or negative pressure to the first lens membrane 2210 and the second lens membrane 2220. For example, the walls 2265 and 2275 may be coupled to a variable volume element (not shown), a clamping and stretching mechanism such as a muscle wire (not shown), or a press and pull mechanism such as a cam (not shown). Under any configuration, the walls 2265 and 2275 are preferably configured so that they do not obstruct an optical path between the first lens membrane 2110 and the second lens membrane 2120 when the walls 2265 and 2275 are stretched into the optical channel 2201.

Attention is now drawn to FIGS. 23A-D, which each illustrate one configuration of a fluidic lens apparatus in accordance with certain of the embodiments of the invention. Each of the FIGS. 23A-D include a tunable lens element 2310, a lens membrane 2315, a reservoir 2339 and a pressure vessel 2335.

Figure 23A:
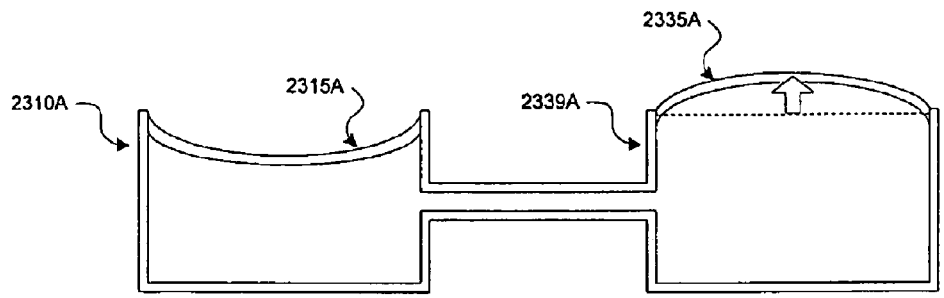
FIGS. 23A-D each illustrate a configuration of a fluidic lens apparatus in accordance with certain of the embodiments of the invention.
Figure 23B:
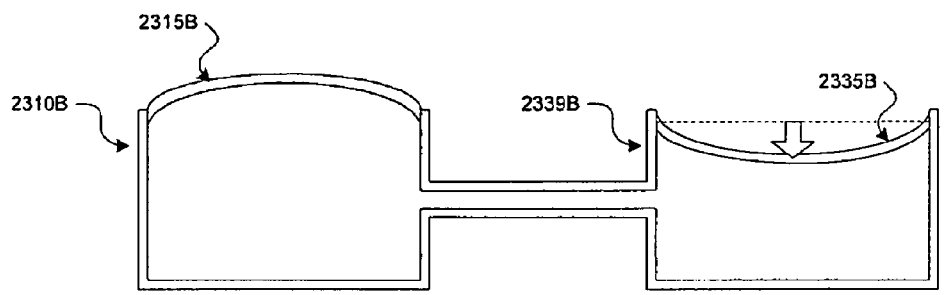

As shown in FIGS. 23A and B, the pressure vessel 2335 forms at least one wall of the reservoir 2339. For example, the pressure vessel 2335 may be a piezoelectric monomorph or bimorph disk. Upon applying a voltage (from a voltage source not shown) to the disk, its profile bends to vary the volume of a fluidic medium in both the reservoir 2339 and the tunable element 2310.

Figure 23C:
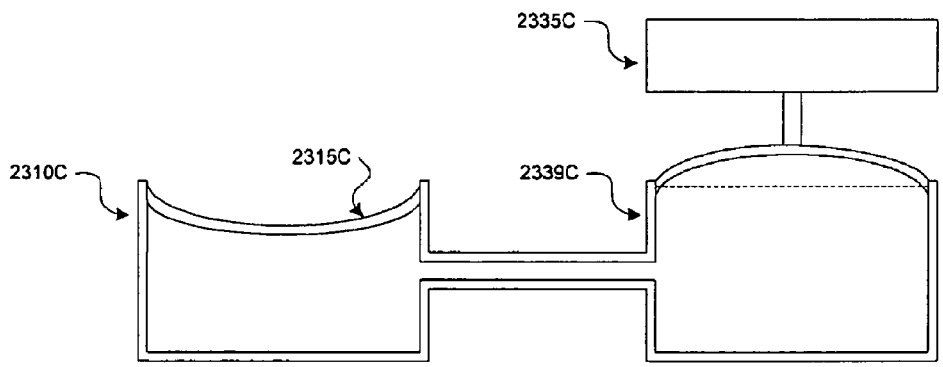
Figure 23D:
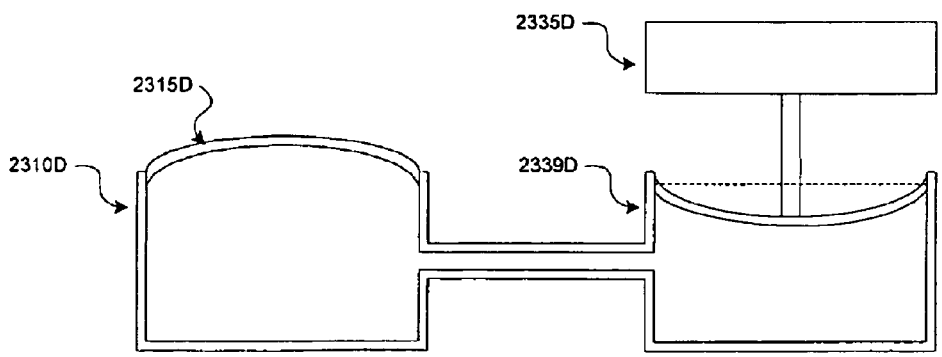

As shown in FIGS. 23C and D, the pressure vessel 2335 is positioned externally in relation to the reservoir 2339. For example, the pressure vessel 2335 may be screw (or other device) that varies the volume of a fluidic medium in both the reservoir 2339 and the tunable element 2310. In accordance with FIGS. 23C and D, the pressure vessel 2335 applies pressure to at least a flexible portion of a wall of the reservoir 2339.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms.

What is claimed is:

1. A tunable lens system comprising:
a first fluidic lens element forming a first cavity in which is stored a first volume of a fluidic medium;
a first reservoir forming a second cavity in which is stored a second volume of the fluidic medium;
a first pressure vessel capable of causing the fluidic medium to move between the first cavity and the second cavity so as to vary an optical property of the first fluidic lens element;
a first valve disposed between the first fluidic lens element and the first reservoir, wherein the first valve controls movement of the fluidic medium between the first cavity and the second cavity;

a second fluidic lens element forming a third cavity in which is stored a third volume of the fluidic medium; and a second valve disposed between the second fluidic lens element and the first reservoir, wherein the second valve controls movement of the fluidic medium between the third cavity and the second cavity.

2. The system of claim 1, further comprising:

a sensor for receiving one or more light waves that pass through the first fluidic lens element and the second fluidic lens element; and a processor for receiving, from the sensor, one or more signals related to the one or more light waves, wherein the processor operates on at least one of the one or more signals to control the first pressure vessel, the first valve and the second valve.

3. The system of claim 2, wherein the first pressure vessel is positioned within the second cavity, or wherein the first pressure vessel forms at least a portion of the first reservoir.

4. The system of claim 2, wherein the sensor is configured to:

receive a first light wave of the one or more light waves, generate, based on the first light wave, a first signal of the one or more signals, and send the first signal to the processor; and wherein the processor is configured to receive the first signal, determine a first target zoom value based on the first signal, generate, based on the first target zoom value, one or more second signals causing a closing of the second valve, an opening of the first valve, and a generating of a first amount of pressure by the first pressure vessel resulting in movement of a portion of the first volume of the fluidic medium from the first cavity to the second cavity, thereby causing a first lens membrane of the first fluidic lens element to form a plano-concave shape, determine a second target zoom value based on the first signal, generate, based on the second target zoom value, one or more third signals causing a closing of the first valve, an opening of the second valve, and a generating of a second amount of pressure by the first pressure vessel resulting in movement of a portion of the second volume of the fluidic medium from the second cavity to the third cavity, thereby causing a second lens membrane of the second fluidic lens element to form a plano-convex shape.

5. The system of claim 2, wherein the sensor is configured to:

receive a series of light waves over a first duration of time, generate a first series of signals based on the series of light waves, and send the first series of signals to the processor; and wherein the processor is further configured to:

instruct the first pressure vessel to apply a plurality of pressures based on the first series of signals so as to alternate an increasing of and a reducing of the first volume of the fluidic medium by decreasing amounts until a target level of focus is achieved.

6. The system of claim 2, wherein the sensor is configured to:

receive a series of light waves over a first duration of time, generate a first series of signals based on the series of light waves, and send the first series of signals to the processor; and wherein the processor is further configured to:

instruct the first pressure vessel to apply a plurality of pressures based on the first series of signals so as to first increase the first volume of the fluidic medium by a first amount and then decrease the increased first volume by a second amount that is less than the first amount until a target level of focus is achieved.

7. The system of claim 2, wherein the sensor is configured to:

receive a series of light waves over a first duration of time, generate a first series of signals based on the series of light waves, and send the first series of signals to the processor; and wherein the processor is further configured to:

instruct the first pressure vessel to apply a plurality of pressures based on the first series of signals so as to first increase the first volume of the fluidic medium by a first amount and then further increase the increased first volume by a second amount that is less than the first amount until a target level of focus is achieved.

8. The tunable fluidic lens of claim 2, wherein the first fluidic lens element and the second fluidic lens element are axially aligned so that a first light wave passes through a middle portion of a first lens membrane of the first fluidic lens element and then passes through a middle portion of a second lens membrane of the second fluidic lens element prior to being received by a middle portion of the sensor.

9. The tunable fluidic lens of claim 1, wherein the first fluidic lens element is reflective as opposed to transmissive.

* * * * *